(12) United States Patent
Hyer et al.

(10) Patent No.: US 9,074,923 B2
(45) Date of Patent: Jul. 7, 2015

(54) SYSTEM AND METHODS FOR BELT CONVEYOR WEIGHING BASED ON VIRTUAL WEIGH SPAN

(75) Inventors: Frank S. Hyer, Duxbury, MA (US); Richard J. Tolles, Plymouth, MA (US)

(73) Assignee: Hyer Industries, Inc., Pembroke, MA (US)

(*) Notice: Subject to any disclaimer, the term of this patent is extended or adjusted under 35 U.S.C. 154(b) by 364 days.

(21) Appl. No.: 13/599,292

(22) Filed: Aug. 30, 2012

(65) Prior Publication Data

US 2014/0062709 A1    Mar. 6, 2014

(51) Int. Cl.
G01G 11/00 (2006.01)
G01G 11/04 (2006.01)

(52) U.S. Cl.
CPC ............. *G01G 11/00* (2013.01); *G01G 11/043* (2013.01)

(58) Field of Classification Search
CPC .... G01G 11/00; G01G 11/043; G01G 11/046
USPC .......................................................... 177/16
See application file for complete search history.

(56) References Cited

U.S. PATENT DOCUMENTS

| | | | |
|---|---|---|---|
| 1,298,302 A | | 3/1919 | Davis |
| 2,997,175 A * | | 8/1961 | Gordon ........................... 222/56 |
| 3,129,217 A | | 6/1964 | Mell |
| 3,489,885 A | | 1/1970 | Kintner |
| 3,559,451 A | | 2/1971 | Hyer et al. |
| 3,610,908 A * | | 10/1971 | Karosas ........................ 708/826 |
| 3,679,010 A * | | 7/1972 | Bullivant ........................ 177/16 |
| 3,754,126 A * | | 8/1973 | Williams, Jr. ................ 702/175 |
| 3,868,643 A | | 2/1975 | Bullivant |
| 3,924,729 A * | | 12/1975 | Flinth et al. ...................... 177/16 |
| 3,960,225 A * | | 6/1976 | Hyer et al. ..................... 177/121 |
| 4,036,316 A | | 7/1977 | Rock |
| 4,126,196 A * | | 11/1978 | Hyer et al. .................... 177/121 |
| RE29,944 E | | 3/1979 | Hyer et al. |

(Continued)

FOREIGN PATENT DOCUMENTS

DE        4414715 A1    11/1995

OTHER PUBLICATIONS

"Implementing a Queue Using a Circular Array" (http://www.mathcs.emory.edu/~cheung/Courses/171/Syllabus/8-List/array-queue2.html), Emory University, Atlanta, GA, Oct. 21, 2014.*

(Continued)

*Primary Examiner* — Randy W Gibson
(74) *Attorney, Agent, or Firm* — Hamilton, Brook, Smith & Reynolds, P.C.

(57) ABSTRACT

Imperfections in conveyor belting and its supporting elements can adversely affect weighing accuracy of belt scales, particularly when weighing and/or metering low density materials, such as those encountered in the snack food industry. A system and methods for a belt conveyor according to an embodiment of the present invention provide simultaneous benefits of both short and long weigh spans. According to an embodiment of the present invention, a virtual weigh span may be programmably set to adjust for variations in the belt conveyor weighing system. Advantages include, higher degrees of accuracy and calibration to account for changes in the belt or belting system over time using non-mechanical adjustments. In addition, weight measurement error producing effects, some that may not be particularly known, may be reduced.

47 Claims, 17 Drawing Sheets

(56) References Cited

U.S. PATENT DOCUMENTS

| | | | | |
|---|---|---|---|---|
| 4,418,773 A | * | 12/1983 | Finet et al. | 177/16 |
| 5,044,819 A | * | 9/1991 | Kilheffer et al. | 404/72 |
| 5,184,733 A | * | 2/1993 | Arnarson et al. | 209/585 |
| 5,753,866 A | * | 5/1998 | Ikeda et al. | 177/25.18 |
| 6,211,470 B1 | * | 4/2001 | Beran et al. | 177/16 |
| 6,433,288 B1 | * | 8/2002 | Olafsson | 177/145 |
| 7,098,409 B2 | * | 8/2006 | Liang et al. | 177/1 |
| 7,279,644 B1 | * | 10/2007 | Kasel | 177/25.13 |

OTHER PUBLICATIONS

Notification of Transmittal of the International Preliminary Report on Patentability of the International Searching Authority, or the Declaration, PCT/US2013/052251, date of mailing Aug. 21, 2014.
Notification of Transmittal of the International Search Report and the Written Opinion of the International Searching Authority, or the Declaration, PCT/US2013/052251, date of mailing Oct. 22, 2013.
Colijn, H., Weighing and Proportioning of Bulk Solids, $2^{nd}$ Edition, Trans Tech Publications, Clausthal-Zellerfield, Germany (1983). Table of Contents, Chapters 2, 5, 7, 8, & 9.

* cited by examiner

TIR CREATES "WOBBLE" EFFECT

SMALLER ROLL TURNS FASTER THAN LARGER ROLL

TIR CREATES "WOBBLE" EFFECT

TENSION CREATES DOWNWARD FORCE ON IDLER 2

US 9,074,923 B2

SYSTEM AND METHODS FOR BELT CONVEYOR WEIGHING BASED ON VIRTUAL WEIGH SPAN

BACKGROUND OF THE INVENTION

The prime purpose of a belt conveyor system is to move material from one point to another. Weighing is a useful function of materials handling or transportation aspects of a belt conveyor system. Weighing bulk materials in volume may require consideration of storage, feeding, weighing, and other functions, such as readout of weighing data.

Many factors affect design and selection of equipment for weighing bulk materials. For example, material flow characteristics are considered when arranging a weighing system. Particle size, percent moisture, aeration, and free-flowing and non-free-flowing characteristics are a few flow characteristics typically taken into consideration. An automatic weighing system may control the proportioning of bulk materials, such as would be needed for weighing of ingredients into a process that may blend ingredients and may be responsible for weighing during receiving or shipping of bulk materials.

For weighing, the belt conveyor system may incorporate one or more belt scales. Various types of feeders have been developed to feed materials in a belt conveyor system such that a uniformly consistent stream of material may be applied to the belt scale. Since a belt scale senses material over a known length of belting, weight is frequently expressed in terms of weight values per unit of length, such as pounds per foot (lb/ft). Weigh values per unit length are often multiplied by velocity terms, such as feet/minute (ft/min), in order to establish flow rate, such as pounds per minute (lb/min) or tons per hour (TPH).

Belt scales fit into all types of bulk material handling facilities, require little space, and, if designed correctly, may cause no interruption in the flow of material. Belt scales are the most common type of continuous weighing devices, and include one or more conveyor idlers mounted on a structural frame, such as a weighbridge. Medium to high volume weighing typically requires a weigh hopper or continuous weigher. Continuous weigh feeders constitute a special application of belt scales.

Weigh belt feeders generally utilize a belt to draw the material through a shear gate and modulate a speed of the belt to control a flow rate of material being drawn from a storage unit, such as a bin, bunker, silo, hopper, or other suitable storage-type feeder. The material may be fed over a weighing device such as the belt scale. Weigh feeders include the weighing device to control the flow rate of discharge of material from the storage unit. Between the weigh feeder inlet and outlet, the weight values per unit of length of the material may be measured. At any convenient location on the feeder the velocity of the belt may be measured. The product of the two measurements is the flow rate which is compared to a setpoint. If a difference exists between the two, then a signal may be relayed to the feed section so as to increase or decrease the volume entering the feeder. Thus, the weight sensing function is an integral part of the system.

Belt scales are offered with varying numbers of weighing idlers (e.g., rollers equipped with ball bearings over which the conveyor belt passes). Typically, the number of weigh idlers ranges from one to six, but there are cases where the number may exceed six. The weigh idlers are typically spaced apart evenly throughout the weighing region of the conveyor, with a typical spacing being between 2.5 and 6 feet. Belt scales offer a structural weigh span based on the number of weighing idlers. The sensitivity to belt loading at each of the weigh idlers may be the same, as is the case with a "full floating" weighbridge, or it may vary, as is the case with a pivoted weighbridge. A belt load may be transmitted from the weighbridge directly or via a lever system to a load sensing device.

The signal from the load sensing device is usually combined with another signal representing belt speed. The combined output from load and belt speed sensors may provide the flow rate of the material passing over the scale by providing a flow rate (e.g., lbs/min) signal. The belt conveyor system may include a totalizer to integrate the flow rate signal with time, and the total tonnage (e.g., lbs) carried over the belt scale may then be registered and displayed. By weighing material "en route," a belt conveyor system may quantify flow of material, thus providing a means to monitor the flow pattern in measurable specific terms.

In a belt conveyor system, long weigh spans are favored for weighing accuracy, or totalization of weight, in that they carry heavier loads and provide a greater degree of belt load averaging. As a result, a long weigh span provides greater immunity to extraneous conveyor tension, stiffness influence factors, belting construction irregularities, and sporadic disturbances, such as those that may arise from mechanical shocks and gusts of wind. However, the increased averaging ability of a long weigh span works against a conflicting objective of rapid control response. On the other hand, shorter weigh spans have limited load averaging ability and, thus, are responsive to shorter term fluctuations along the length of the belt. Thus, the length of the weigh span may play an important role in establishing weighing accuracy and control response limits of a belt conveyor system.

SUMMARY OF THE INVENTION

In accordance with some embodiments, a belt conveyor weighing system, corresponding apparatus or method, may comprise a conveyor belt configured to transport material across a transport distance. A sensor unit may be configured to sense incremental belt travel distance of the conveyor belt and to sense a measured weight of material across a scale weigh span within the transport distance. A computational unit may be configured to compute at least one loading metric (e.g., lbs/ft) of a computed weight of material sensed over an effective weigh span equal to a sum of the scale weigh span and a virtual weigh span programmably set to a given length of incremental belt travel distance.

The virtual weigh span may be programmably set to a given length of incremental travel distance to adjust for variations in the belt conveyor weighing system. The computational unit may be configured to compute the at least one loading metric as a function of the weight of material sensed and the effective weigh span, to monitor transport of the material independent on a speed of the conveyor belt.

The at least one loading metric computed may represent an average weight of material per a unit length over the effective weigh span. The computational unit may further be configured to integrate, continuously, the at least one loading metric computed with respect to the incremental belt travel distance sensed to compute a total weight of material that has passed over the effective weigh span. The virtual weigh span may be programmably set to a length equal to a multiple of a complete revolution of the conveyor belt. The multiple may be one or more.

The at least one loading metric computed may represent an average weight of material per a unit length over the effective weigh span. The computational unit may be further configured to compute a speed (e.g., ft/min) of the conveyor belt, where the speed of the conveyor belt may be based on a rate of change of the incremental belt travel distance sensed. The computational unit may be further configured to compute a flow rate of material, the flow rate of material may be computed as a function of the at least one loading metric computed and the speed of the conveyor belt computed.

The at least one loading metric computed may represent an average weight of material per a unit length over the effective weigh span. The computational unit may be further configured to compute a speed of the conveyor belt and to compute an instantaneous loading metric (e.g., lbs/ft) as a function of the measured weight of material sensed across the scale weigh span. The computational unit may be further configured to integrate, continuously, the instantaneous loading metric computed over the incremental belt travel distance sensed and to compute an instantaneous flow rate of material. The instantaneous flow rate of material may be computed as a function of the instantaneous loading metric computed and the speed of the conveyor belt computed.

The computational unit may be further configured to produce at least one signal used to trigger at least one alarm by reacting to at least one of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

The belt conveyor weighing system may comprise a display unit configured to display at least one indication of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

The computational unit may be further configured to produce at least one control signal from at least one of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

The computational unit may be further configured to compute an instantaneous loading metric. The belt conveyor weighing system may further comprise a feed element configured to apply material to the conveyor belt as a function of the at least one loading metric computed or the instantaneous loading metric computed.

The computational unit may be further configured to compute an instantaneous loading metric. The belt conveyor weighing system may further comprise a first feed element and a second feed element; the second feed element may be downstream of the first feed element. The second feed element may be configured to apply an additive to the material responsive to the at least one loading metric computed or the instantaneous loading metric computed.

Further, the virtual weigh span may be based on a maximum flatness deformation length of the conveyor belt, a distance from a first point being within the scale weigh span to a second point of material discharge, or a multiple of a circumference of a roller, the roller supporting the conveyor belt within the scale weigh span.

In addition, the conveyor belt may be coupled to a head pulley and a tail pulley and supported therebetween by at least one support element. The sensor unit may include a scale operatively coupled to one or more of the at least one support element, and the scale weigh span may be defined by a distance for which weight of the material is measureable by the scale.

The conveyor belt may be coupled to a head pulley and a tail pulley and supported therebetween by at least one support element, the at least one support element may be at least one freely rotatable element or at least one non-rotatable frictional element. The at least one freely rotatable element optionally may be a roller or an idler. The at least one non-rotatable frictional element may optionally be a flat slider plate or a fixed circular, inverted U-shaped, or inverted V-shaped rod acting as a stationary roller. The sensor unit may comprise a scale operatively coupled to the at least one support element, and the sensor unit may be further configured to output an indication of the measured weight of the material sensed within the scale weigh span to the computational unit.

The sensor unit may comprise a scale, with the scale supporting the conveyor belt and its support structure entirely, and the scale weigh span may be equal to the transport distance.

Further, the computational unit may include memory configured to store at least one weight value corresponding to the measured weight of the material sensed and at least one distance value corresponding to the incremental belt travel distance of the conveyor belt sensed. The computational unit may be configured to compute the at least one loading metric based on a selection of at least one weight value stored and at least one distance value stored.

The memory may include paired-element circular arrays configured to store the at least one weight value and the at least one distance value, and the computational unit may be configured to overwrite oldest-populated circular array paired-elements with current values of the at least one weight value and the at least one distance value. Further, the sensor unit may comprise a travel sensor configured to generate a number of pulses per incremental belt travel distance of the conveyor belt and the at least one distance value stored may be a count of the number of pulses generated.

The belt conveyor weighing system may further comprise a motor configured to drive the conveyor belt as a function of the at least one loading metric computed.

In addition, the sum of the scale weigh span and a virtual weigh span programmably set to a given length of incremental belt travel distance may be a first sum, the virtual weigh span may be a first virtual weigh span, the given length of incremental belt travel distance may be a first given length of incremental belt travel distance, the at least one loading metric computed may be a first at least one loading metric computed, and the computed weight of material sensed may be a first computed weight of material sensed. The computational unit may be further configured to compute a second loading metric of a second computed weight of material sensed over a second effective weigh span less than the first effective weigh span. The second effective weigh span may be equal to the scale weigh span or may be equal to a second sum of the scale weigh span and a second virtual weigh span programmably set to a second given length of incremental belt travel distance.

The computational unit may be further configured to integrate, continuously, the first at least one loading metric computed with respect to the incremental belt travel distance sensed to compute a total weight of material that has passed over the first effective weigh span. The computational unit may be further configured to produce at least one control signal or at least one alarm signal as a function of the second loading metric computed.

Furthermore, a non-transitory computer-readable medium may have encoded thereon a sequence of instructions which, when executed by a processor, causes the processor to sense an incremental belt travel distance of the conveyor belt transporting material across a transport distance, sense a measured weight of the material across a scale weigh span within the transport distance, and compute at least one loading metric of a computed weight of material sensed over an effective weigh span equal to a sum of the scale weigh span and a virtual weigh span programmably set to a given length of incremental belt travel distance.

In addition, an apparatus for weighing material on a conveyor belt may comprise means for sensing an incremental belt travel distance of the conveyor belt transporting material across a transport distance, means for sensing a measured weight of the material across a scale weigh span within the transport distance, and means for computing at least one loading metric of a computed weight of material sensed over an effective weigh span equal to a sum of the scale weigh span and a virtual weigh span programmably set to a given length of incremental belt travel distance.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Length of a weigh span to weigh material on a conveyor belt plays a useful role in establishing weighing accuracy and control response limits of a belt weighing system. Long weigh spans are more accurate for weighing the material. However, because of their longer transport time, long weigh spans are not as responsive to rapid loading changes as short weigh spans.

Because short weigh spans have improved responsiveness due to their short transport time, short weigh spans tend to be more useful for certain control and alarming functions than long weigh spans. However, short weigh spans are more reactive to many extraneous influences (e.g., belt splice impacts, roller wobble effects, roller unbalance, miscellaneous belting irregularities, or non-uniformities such as lack of flatness of the belt, and non-uniform weight) because they are more responsive to rapidly changing conditions.

Novel system and methods described herein provide a weigh span that may be extended beyond the length of a structural belt weigh span, particularly for purposes of load averaging. The system and methods herein provide simultaneous benefits of both short and long weigh spans. In addition, error producing effects, some that may not be particularly known, may be reduced. The novel methods and apparatus described herein may apply to any suitable system that may control a flow rate of material. While the techniques described herein may be particularly relevant to weigh belt feeder applications handling low density products (e.g., potato chips, tobacco, textiles, miscellaneous leafy organic materials, etc.) or high density materials (e.g., rocks, gravel, coal), the techniques may also be applied to other suitable systems as well, including systems that may not perform a weighing function.

Figure 1:
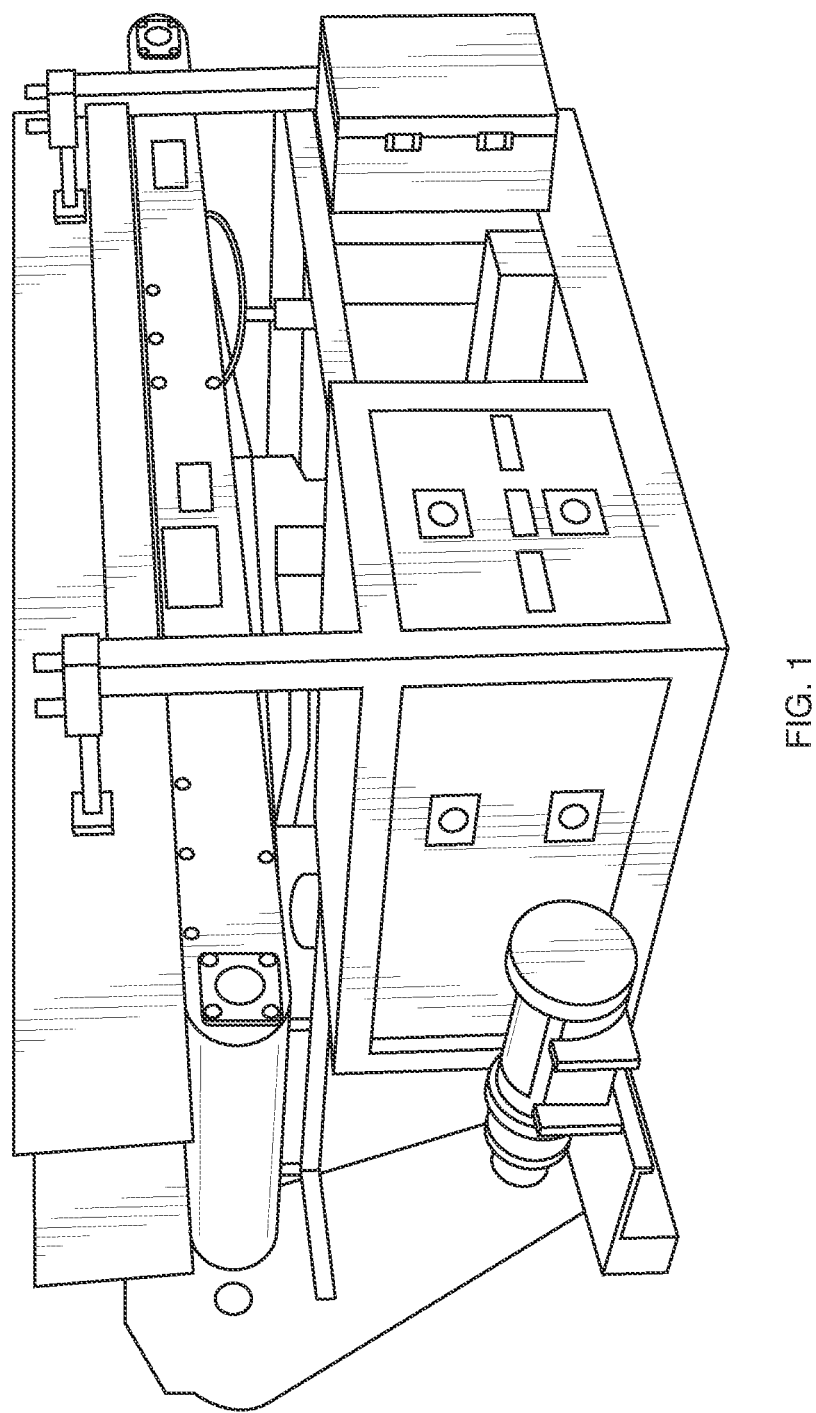
FIG. 1 shows an example weigh belt feeder.

FIG. 1 shows an example weigh belt feeder. Weigh feeders generally utilize a belt to draw material from a hopper, or any other suitable device, and then feed the material over a weighing device. A belt feeder is but one type of feeder; various other types of feeders, such as screw, live bottom pigment bin, and vibratory feeders, have been developed. The systems and methods described herein are not restricted to any specific type of feeder.

Figure 2:
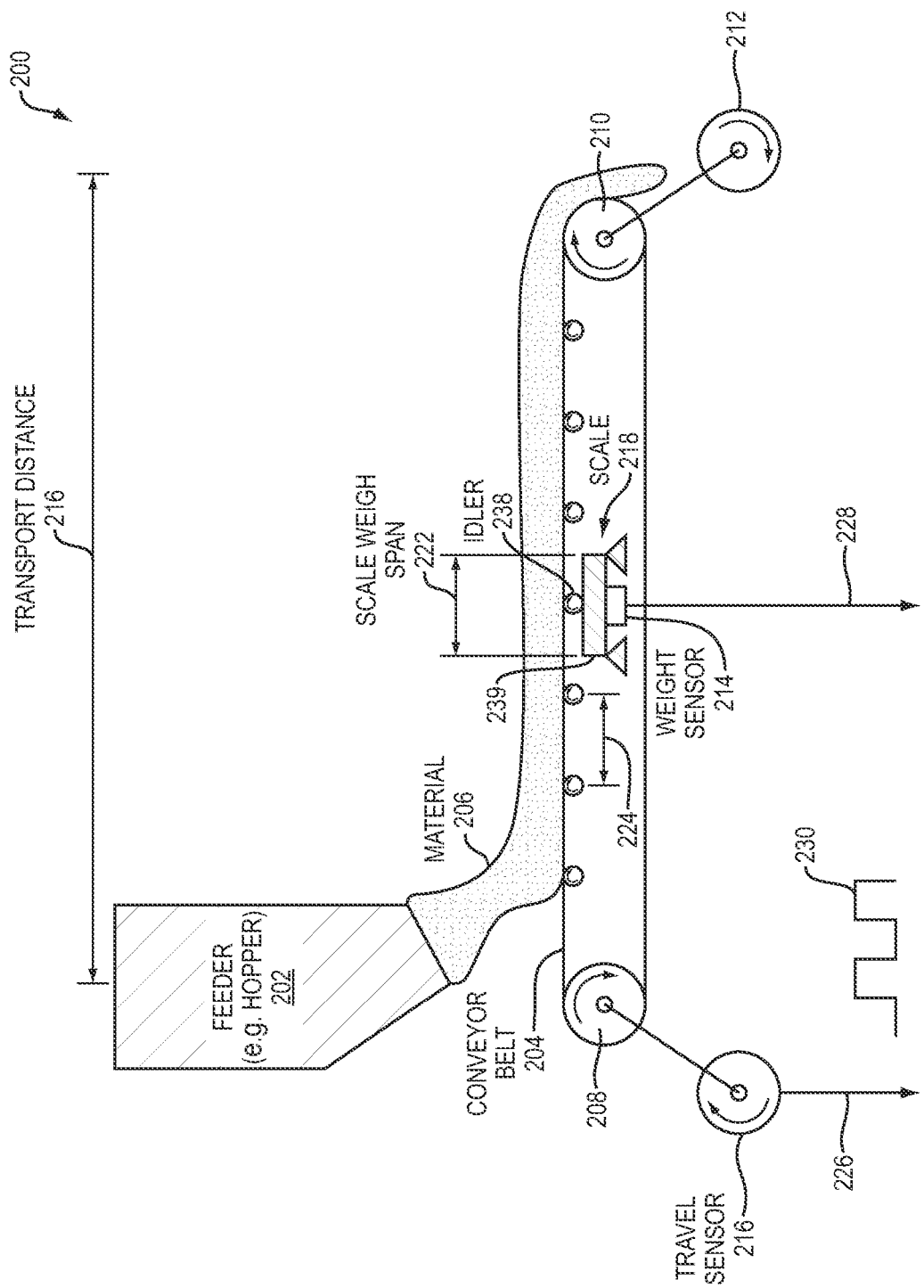
FIG. 2 is a schematic representation of a belt feeder.

FIG. 2 is a schematic view of a belt feeder 200. The belt feeder 200 is shown as being substantially horizontal; however, the belt feeder may be arranged in any suitable orientation. For example, the belt feeder may be arranged on an incline. Belt feeders typically include a continuous rubber belt, such as conveyor belt 204, to draw material 206 from a hopper 202. The conveyor belt 204 is typically placed under a slotted hopper opening feeding along the length of the hopper; however, the draw of material may be done in any suitable orientation. The conveyor belt 204 is typically supported by one or more closely spaced idlers 238 and is driven by end pulley 208 or 210. The end pulleys 208 and 210 are generally referred to as a tail pulley 208 and a head or discharge pulley 210. An AC or DC variable speed motor 212 may be mounted to the conveyor framework to drive either the head pulley 210 or the tail pulley 208. Material 206 may travel a transport distance 216 as it flows out of the hopper and is discharged at the head pulley 210. The belt feeder 200 may feed material 206 over any suitable weighing device, such as a conveyor belt scale 218. The methods described herein may be applied to any type of belt scale, for example, applying these methods to a system employing a nuclear belt scale is within this scope. Nuclear scales utilize the principle of absorption of nuclear radiation to measure conveyor loading, they have no moving parts, and make no physical contact with the conveyor. Nuclear scales may be used on all types of conveyors including belt conveyors.

Belt scales are the most common type of continuous weighing devices. Belt scales 218 typically include one or more idlers 238 mounted on a weighbridge 239. The material on a belt to be weighed by a scale does not contact the scale directly. Rather, the material weight may be transmitted through the conveyor belt 204 to the scale 218. The load of the belt 204 may be transmitted from the weighbridge 239 directly or via a lever system (not shown) to a load sensing device such as a weight sensor 214. The weight sensor 214 may be activated in any suitable manner. For example, the weight sensor 214 may be electrically, mechanically, hydraulically, or pneumatically activated. The weight sensor 214 may be any suitable device, such as a transducer (not shown). A transducer may be any type of transduction element, for example, a capacitive, electromagnetic, inductive, piezoelectric, potentiometric, relative, resistive, or strain-gage type transduction element.

The weight sensor 214 may produce a weight signal, such as loading signal 228. The loading signal 228 (e.g., weight signal) may reflect sensed weight over the scale weigh span 222 indicating an average weight over the scale weigh span 222. The weight signal 228 may be combined with a travel signal 226 that may represent a speed of the belt. Sensing a speed of the belt may be done in any suitable manner. The speed of the belt may be sensed by a travel sensor 216, such as a belt displacement transducer. The travel sensor 216 may produce a travel signal 226 that represents belt travel (displacement) over time. The travel sensor 216 may be an AC or DC tachometer that may produce a pulse stream output 230 that is a representation of the speed of the belt. The frequency of the pulses may be an analog of the belt speed. The travel sensor 216 may be a pulse generator that includes a wheel or disc (e.g., optical transducer) that is in contact with the conveyor belt 204 and is rotated based on displacement of the conveyor belt 204. The pulse generator may generate a predetermined number of pulses per unit length of displacement of the conveyor belt 204. Other sensors, such as electro magnetic resolvers that output complementary analog sinewaves may alternatively be used to sense travel distance. The travel signal 226 may be combined with the weight signal 228 and may be used, for example, to determine the total mass of material that has passed over belt scale 218.

Belt scales may offer a scale (structural) weigh span 222 based on the number of weighing idlers employed. The scale weigh span 222 may be within the transport distance 216. A distance 224 between adjacent idlers may be uniform; however, the distance between idlers need not be uniform. A belt scale may support one or more belt support elements that may be in the form of idlers, or other suitable elements such as freely rotatable rollers, flat slider plates, or fixed circular rods that act as stationary rollers. The scale weigh span may be defined by a distance for which weight of the material is measureable by the scale.

Scale weigh span may be defined as the length of belting that spans all of the weighed support elements plus one half of the combined length of unsupported belting to either side of the scale.

Figure 3A:
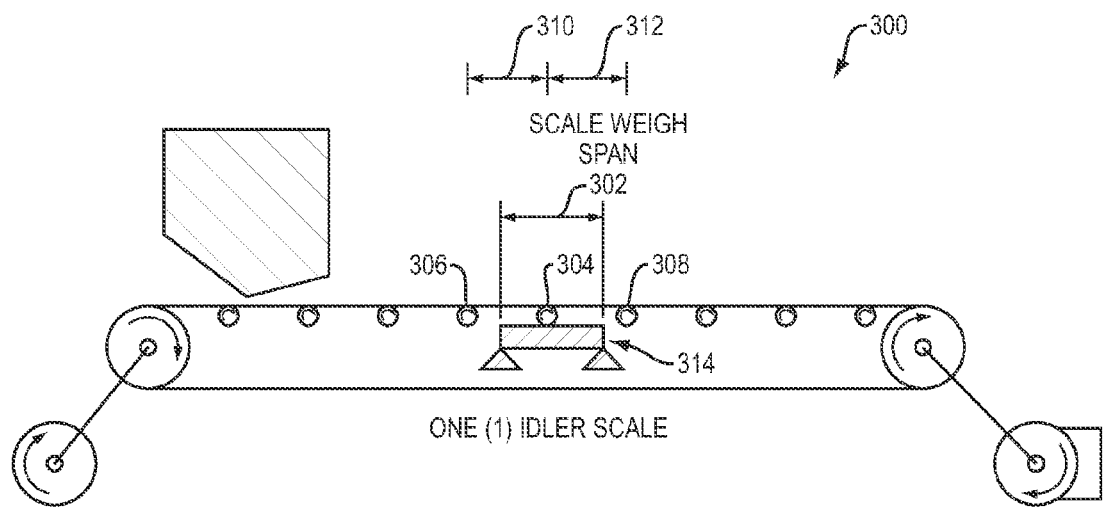
FIG. 3A is a schematic representation of a belt feeder including a one-idler scale.

FIG. 3A is a schematic representation of a belt feeder including a one-idler scale. FIG. 3A illustrates a belt feeder 300 that includes a one-idler belt scale 314 that offers a scale weigh span 302. The ("weigh") one-idler 304 scale 314 is located between two fixed ("non-weigh") idlers 306 and 308, where the distance 310 between the weigh idler 304 and fore non-weigh idler 306 and a distance 312 between the weigh idler 304 and after non-weigh idler 308 is a given number of feet, such as four feet. In the example of a four foot idler spacing, the length of belting supported by the measurement idler 304 is zero feet, the combined length of unsupported belting is eight feet, and as a result, the scale weigh span is four feet.

Another example may be that of a three-idler scale with unequal spacing of three feet and four feet located between fixed idlers twelve feet apart. In this example, the length of belting spanning the three idlers is seven feet, the combined length of unsupported belting is five feet, and one half of unsupported length of belting is two and a half feet. As a result, in this latter example, the scale weigh span is nine and a half feet.

Another example may be that of a two foot long slider deck that is positioned between two slider decks separated by three feet. A length of belting spanning the slider deck is two feet, the combined length of unsupported belting is one foot, and one half of unsupported belting is a half of a foot. As a result, in this example, the scale weigh span is two and a half feet.

The most common arrangement is that of equal spacing throughout the idlers or other support elements. The weigh idlers are normally spaced apart evenly throughout the weighing region, with typical spacing in the range between two and a half and six feet. Four feet is perhaps the most common spacing. For example, a two idler scale may have idlers spaced uniformly apart by four feet. The length of belting spanning supporting the two idlers is four feet, the combined length of unsupported belting is eight feet, and one half of unsupported belting is four feet. As a result, the scale weigh span is eight feet.

As previously described, the length of the weigh span plays a useful role in establishing the weighing accuracy and control response limits of a belt weighing system. As illustrated in FIG. 3A, the weigh span may be a short weigh span.

Figure 3B:
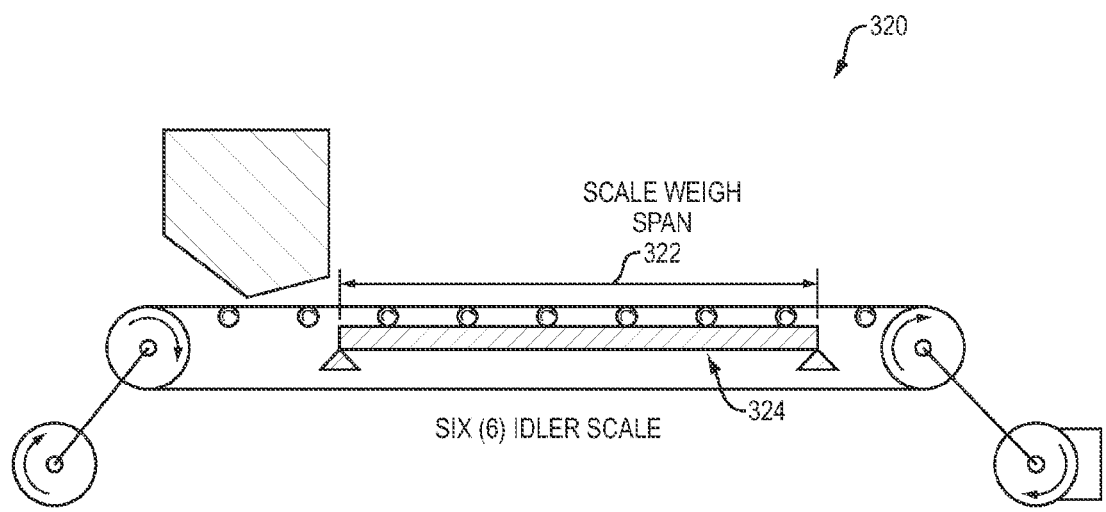
FIG. 3B is a schematic representation of a belt feeder including a six-idler scale.

FIG. 3B is a schematic representation of a belt feeder including a six-idler scale. FIG. 3B illustrates a long weigh span, where the belt feeder 320 is shown as including a six-idler scale 324 that offers a scale weigh span 322. The effectiveness with which the belt scale can interpret material loading on the belt may be diminished by the so-called known "belt effects." Undesirable error-producing effects may affect a system's ability to total material throughput accurately.

Non-uniform belt weight, often due to the construction of the belt material (carcass), is known to produce weighing errors. Other effects associated with variations in belt tensions and belt stiffness have been known to be directly related to a degree of misalignment between scale idlers and adjacent stationary idlers.

Figure 4A:
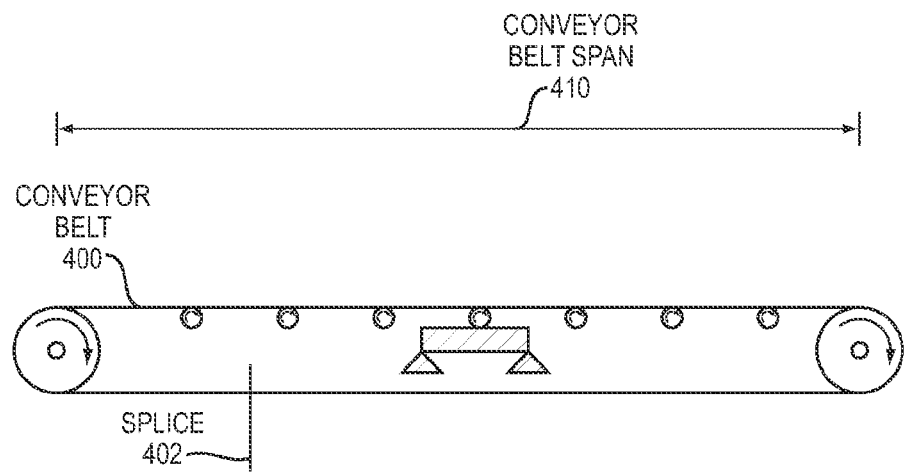
FIG. 4A is a mechanical diagram that shows a conveyor belt splice.

FIG. 4A is a mechanical diagram that shows a conveyor belt splice. FIG. 4A shows of a conveyor belt 400 having a conveyor belt span 410 and a belt splice 402. Some error-producing effects are understood to occur due to the belt splice's impacting the weigh idler.

Other undesirable error-producing effects may not be particularly known and thus, are not addressed by conventional systems. Varying belting irregularities may create disturbances of changing magnitude due to an inherent plasticity and internal hysteresis of a belt material (carcass). Plasticity and hysteresis are responsible for the appearance of "cold setting" of various curvatures throughout a belt's length.

Figure 4B:
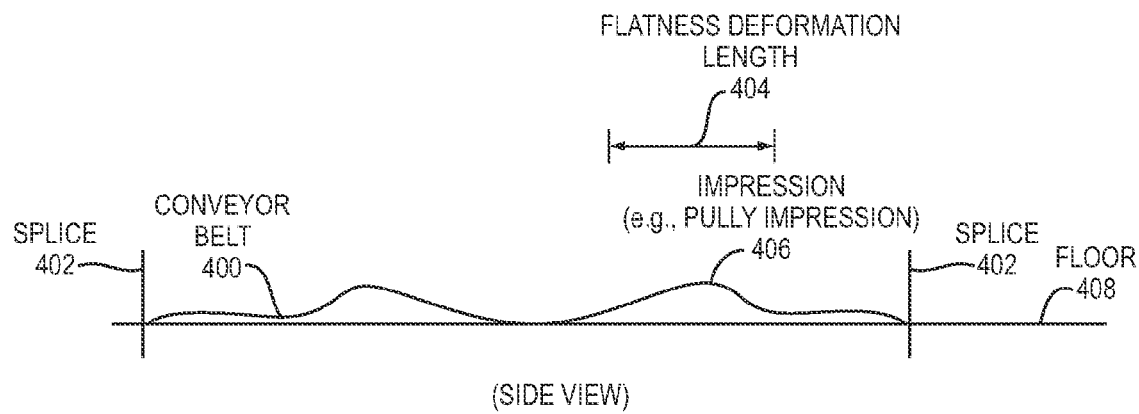
FIG. 4B is a mechanical diagram of a conveyor belt that illustrates non-uniform belt shape including an impression retained by the conveyor belt.

FIG. 4B is a mechanical diagram of a conveyor belt that illustrates non-uniform belt shape including an impression retained by the conveyor belt. FIG. 4B shows of a conveyor belt 400 having an observable wavy shape of the belt that may result due to the belting being rolled up for a time for shipment purposes. In addition, belting left stationary under tension and in contact with various pulleys, such as a head pulley, tail pulley, or gravity take-up pulley, may result in a retained-impression circular-like shape of the belt. These retained impressions may be unstable over time.

As shown in FIG. 4B, a conveyor belt's 400 non-uniform shape is observable when placed on a floor 408. An impressed circular-like shape 406 may have a flatness deformation length 404 as shown. Food grade belts may have a polyester carcass and, thus, may be more susceptible to exhibiting these belting characteristics. These characteristics produce errors that appear as short disturbances that do not remain constant over longer operating times. Similar to belt weight non-uniformity, these belting characteristics create irrelevant control responses and instability in material loading and flow rate displays.

Another error producing effect that may not be addressed by conventional systems is that of the slow change of alignment between adjacent idlers, due to the combination of tight machine tolerances (e.g., 0.002 inches) and a comparably large degree of wobble of assembled idler (rolls, bearings, shafting). A degree of wobble is commonly referred to total indicator run-out (TIR) and may be as high as 0.02 inches for industrial grade idlers.

Figure 5A:
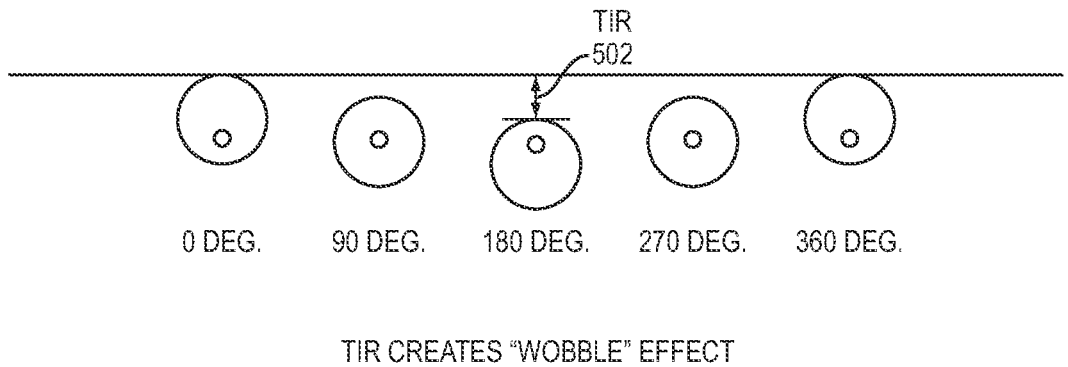
FIG. 5A-5C illustrate idlers (e.g., rollers) having Total Indicator Runout (TIR).
Figure 5B:
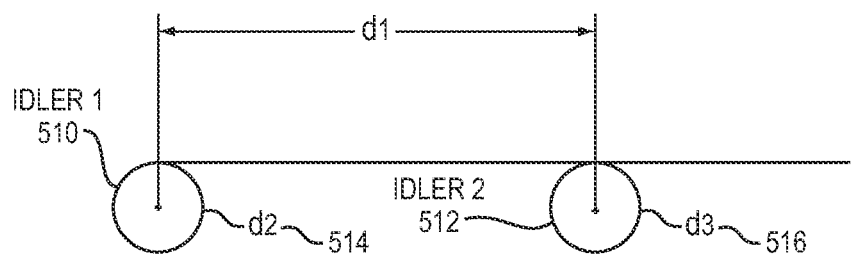
Figure 5C:
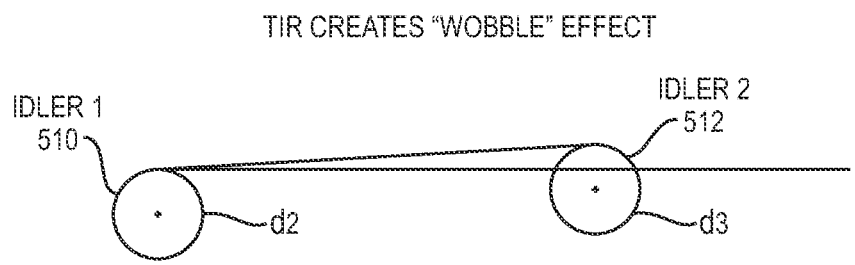

FIGS. 5A-5C illustrate idlers (rollers) having TIR that may cause a vibratory disturbance when the idlers are rotating.

FIG. 5A shows a degree of wobble 502. Due to the tight tolerance on circumference, it may take hundreds or even thousands of feet of belt travel for one-idler to gain a full revolution on its adjacent counterpart. This wobble effect is more pronounced if a single idler scale is employed and the idler spacing is short. The error is based on the interaction of belt tension and belt stiffness with idler misalignment. Whereas a known effect of belt tension and elasticity may represent a systematic or bias (single polarity) error that may be addressed by system calibration, the wobble effect may be unknown as it is slowly changing in magnitude and polarity.

FIG. 5B illustrates the "wobble" effect created from TIR. In the example of FIG. 5B, an idler 510 may have a diameter 514 of d2 inches whereas an idler 512 may have a diameter 516 of d3 inches. Examples of dimensions d2 and d3 may include 05.0000 and 05.0020 inches, respectively. An example distance d3 between idler 510 and idler 512 may include 24.0000 inches. Idler 510 may advance one revolution on idler 512, after N revolutions of idler 512, due to the smaller circumference of idler 510 with respect to idler 512.

The value of N revolutions may be determined by setting the circumferences equal to a same value of belt travel distance. For example: 5.000(3.14159)(N+1)=5.002(3.14159)(N)=belt travel distance, 5.000(N+1)=5.002(N), 5.000(N)+5.000=5.002(N), and thus, N=5.000/0.002=2500 revolutions. Given N=2500 revolutions, a belt travel distance would then be 5.002(3.14159)(2500) inches, or 5.002(3.14159)(2500)/12=3,273.8 feet. At half this distance, misalignment between two idlers is equal to their TIR values, which in this case would be 0.020 inches.

FIG. 5C illustrates the tension that may provide a downward force on idler 512. At a 60 feet/min belt speed, such a misalignment would occur every 27 minutes. However, considering that the belt may be run for approximately 5 minutes or less to establish a zero balance, this error producing effect goes unnoticed. Thus, the wobble effect may be unaccounted for, and may not even be understood to be an attributing error producing effect. The wobble effect may mimic the effect of non-uniform belting weight, so it may be misdiagnosed as being caused by systematic weight non-uniformity throughout the length of the belt. The wobble effect may not be evident during short durations of conveyor operation such as during calibration. The wobble effect may be reduced by averaging the loading signal over a large number of idler roll revolutions.

The novel system and methods discussed herein may address the varying belting irregularities and the wobble effect, as well as other error producing effects that may be understood by one skilled in the art, by providing simultaneous benefits of both short and long weigh spans. The novel system and methods herein provide a short weigh span to be used (e.g., to produce material starvation alarms with provisions to shut down the conveyor delivery system, or to facilitate some other type of corrective control action in the shortest possible time) while simultaneously providing a longer weigh span to increase the accuracy of a weight totalization process and to provide more stable signals for display and recording functions.

As previously described, there are advantages and disadvantages to having many weighing idlers. Single idler scales may provide better control response since the loading signal responds to a shorter length of conveyor belt which, in turn, makes the conveyor belt scale more responsive to instantaneous belt loading variations. However, single idler scales may be subjected to more significant belting influence effects (e.g., belting and idler irregularities) because of their inherent responsiveness.

On the other hand, a six-idler scale may not react to short duration belt loading variations, since it only responds to the average value of the loading across a long section of belting. The load averaging ability of the long weigh span (e.g., a six-idler scale) provides a number of other advantages. For example, the long weigh span may provide smaller load signal excursions during periods of belt splice of idler impact. A long weigh span may reduce effects of belt non-uniformity such as weight, as well as belt shape non-uniformity such as the plastic curvature deformations previously discussed. Thus, a system may benefit by having two weigh spans, operating at the same time. One weigh span may be a long weigh span dedicated for accurate weighing of material, and another may be a short weigh span that may be used for control and alarming functions.

Figure 6A:
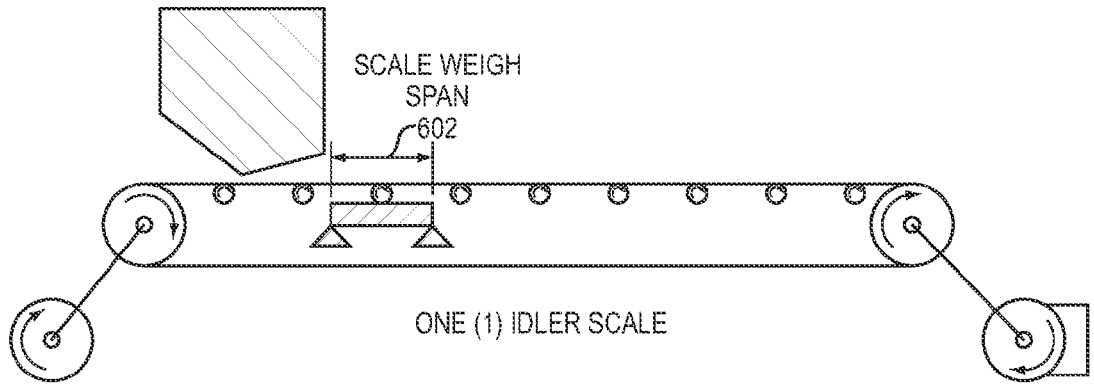
FIG. 6A is a mechanical diagram that illustrates a short weigh span of a one-idler scale.

FIG. 6A is a mechanical diagram that illustrates a short weigh span of a one-idler scale. FIG. 6A illustrates a short weigh span 602 provided by a one-idler scale.

Figure 6B:
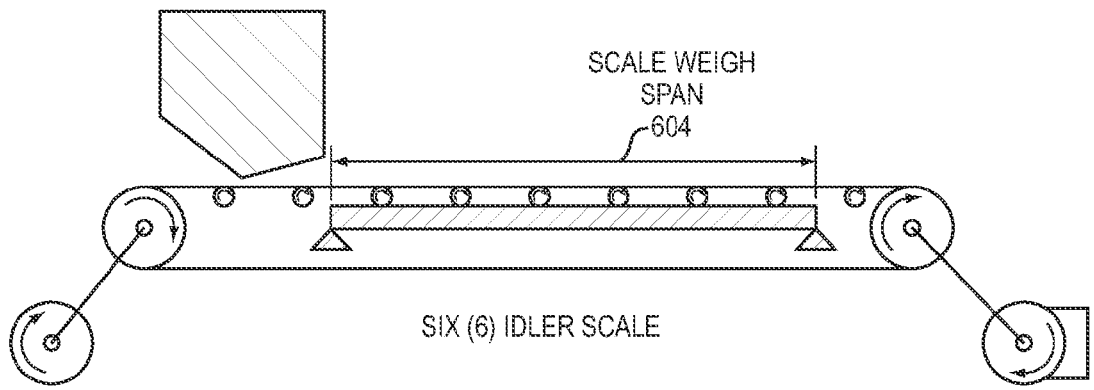
FIG. 6B is a mechanical diagram that illustrates a long weigh span of a six-idler scale.

FIG. 6B is a mechanical diagram that illustrates a long weigh span of a six-idler scale. FIG. 6B illustrates a long weigh span 604 provided by a six-idler scale.

Figure 6C:
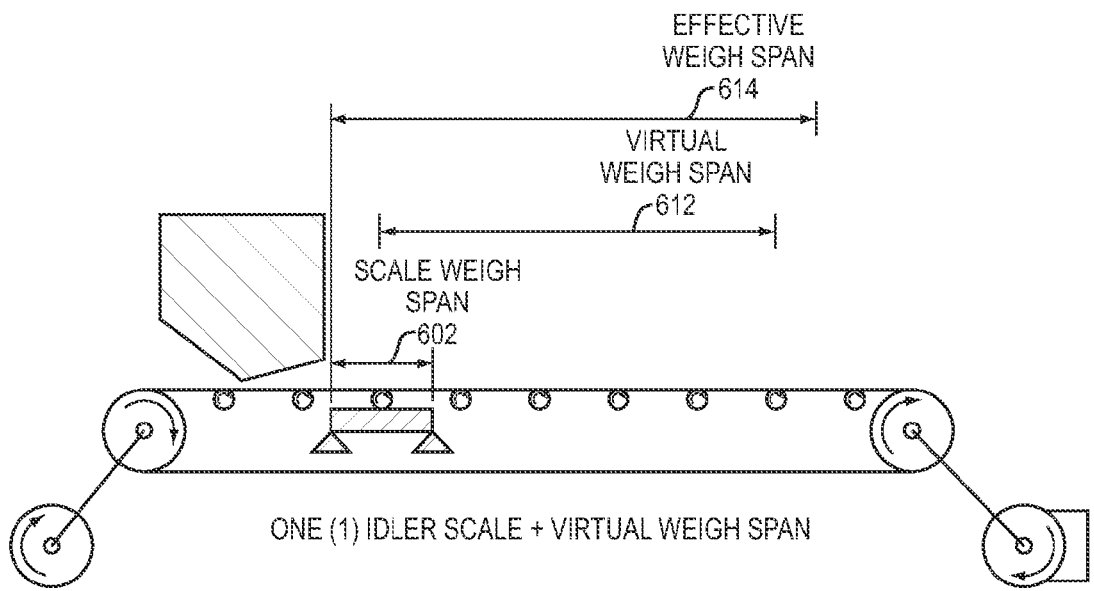
FIG. 6C is a mechanical diagram that illustrates a one-idler scale with both short and long weigh spans.

FIG. 6C is a mechanical diagram that illustrates a one-idler scale with both short and long weigh spans. FIG. 6C illustrates a short weigh span 602 and long weigh span 614 may be provided. An effective weigh span 614 (e.g., an elongated weigh span) may be equal to a sum of a scale weigh span 602 and a virtual weigh span 612. In this example, providing a virtual weigh span 612, both a short weigh span, such as the scale weigh span 602, as well as a long weigh span, such as the effective weigh span 614, may be simultaneously provided. A virtual weigh span 612 may be programmably set to simulate an effective weigh span such as the effective weigh span 614. As illustrated in FIG. 6C, both a short and a long weigh span may be simultaneously provided based on a single idler scale having scale weigh span 602. As shown in FIG. 6C, an effective weigh span 614 may be equal to six-idler scale weigh span 604 illustrated in FIG. 6B. A virtual weigh span may be based on any suitable length, FIG. 6C is just one example illustration. A virtual weigh span may be programmably set so as to achieve results that are effectively the same as those achieved using a multi-idler scale. A virtual weigh span may be programmable set to simulate an effective weigh span.

Figure 7A:
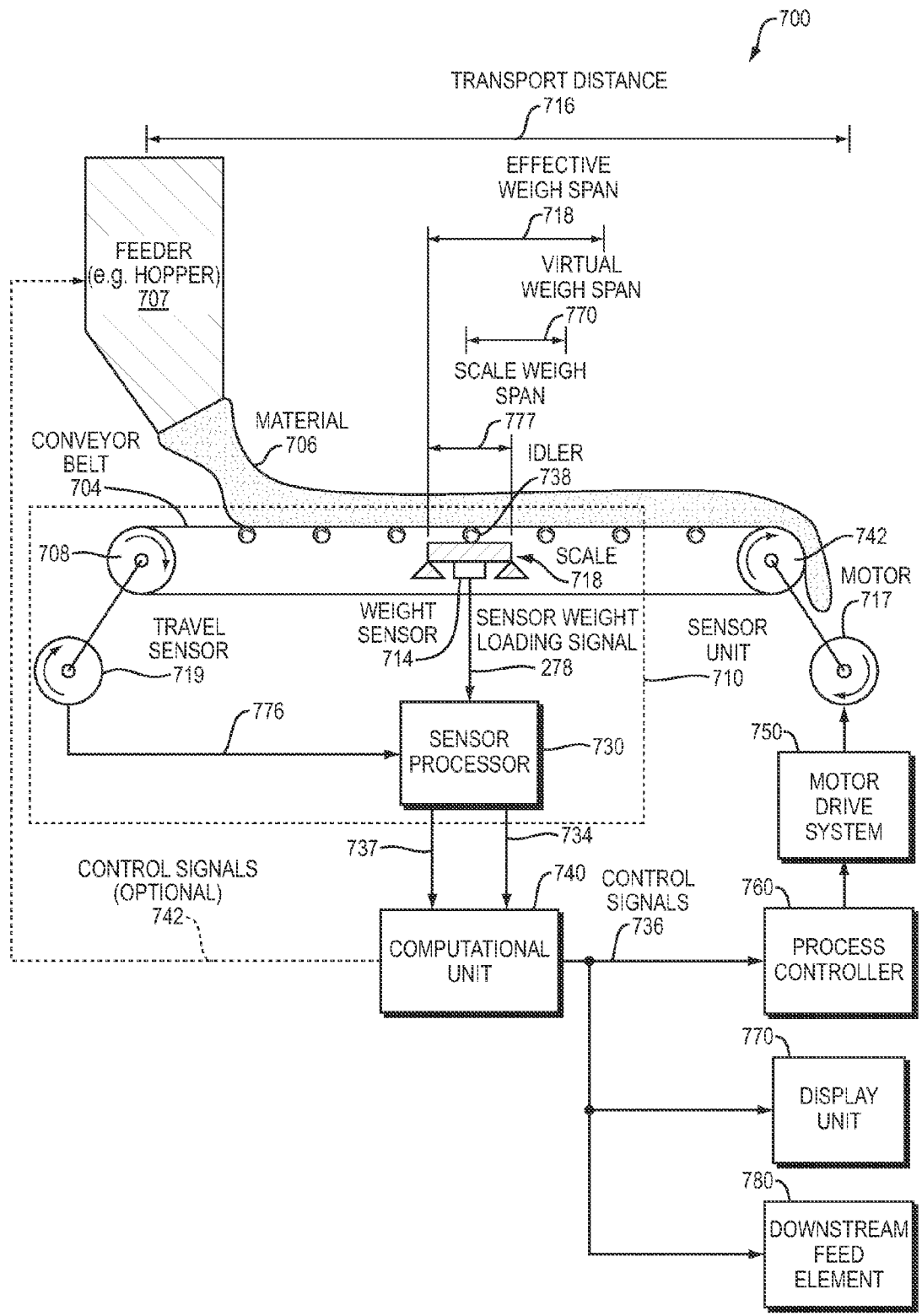
FIG. 7A is a schematic representation of a belt conveyor weighing system.

FIG. 7A is a schematic representation of belt conveyor weighing system 700 that includes a virtual weigh span 770. The belt conveyor weighing system 700 may comprise a conveyor belt 704 configured to transport material 706 across a transport distance 716. A feed element 707 may be configured to apply material 706 to the conveyor belt 704. Material 706 may travel a transport distance 716 as it flows out of the hopper 707 and is discharged at the head pulley 742. In FIG. 7A, the virtual weigh span 770 and effective weigh span 718 are shown as being within the transport distance 716, however, both the virtual weigh span 770 and the effective weigh span 718 may extend beyond transport distance 716 as suitable.

As discussed, long weigh spans are more accurate for weighing the material, but because of their longer transport time are not responsive to rapid loading changes. Short weigh spans are more useful for control and alarming functions due to their improved responsiveness which is due to shorter transport time. A belt conveyor weighing system may be configured to have multiple weigh spans operating simultaneously. For example, a belt conveyor weighing system may dedicate long weigh span for weighing the material and short weigh span for control and alarming functions.

Figure 7B:
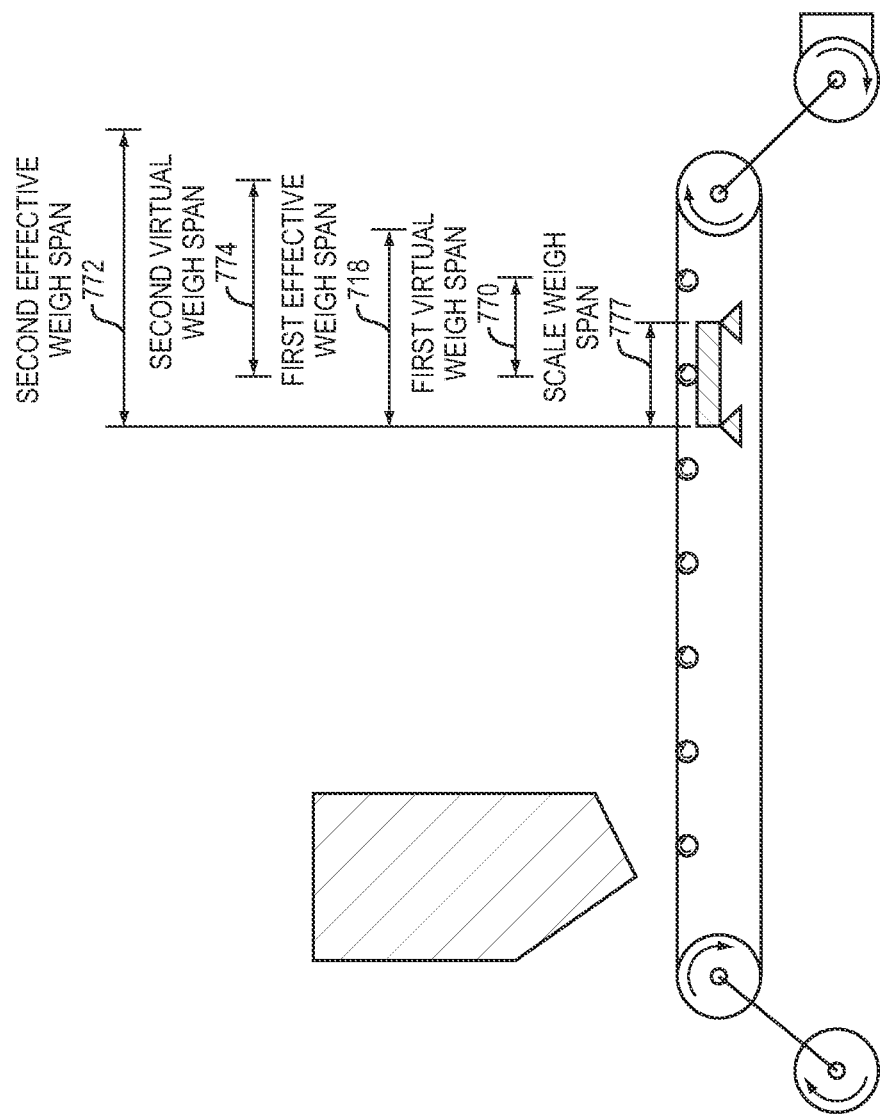
FIG. 7B is an illustration of multiple weigh spans.

FIG. 7B is an illustration of multiple weigh spans. FIG. 7B illustrates the long weigh span may be an effective weigh span 772. The short weigh span may be an effective weigh span 718 of shorter length, or may be the scale weigh span 777. The long weigh span 772 may drive the integration function to arrive at total throughput weight. Short weigh span 718 and/or short weigh span 777 may produce loading and rate signals that may be used for control or alarm functions.

Turning back to FIG. 7A, a sensor unit 710 may be configured to sense incremental belt travel distance of the conveyor belt and to sense a measured weight of material across a scale weigh span 777 within the transport distance 716. As described earlier, the scale weigh span may be defined by a distance for which weight of the material is measureable by the scale.

In addition, as shown in FIG. 7A, the conveyor belt may be coupled to a tail pulley 708 and a head pulley 742 and supported therebetween by at least one support element, the at least one support element may be at least one freely rotatable element or at least one non-rotatable frictional element. The at least one freely rotatable element optionally may be a roller or an idler 738. The at least one non-rotatable frictional element may optionally be a flat slider plate or a fixed circular, inverted U-shaped, or inverted V-shaped rod acting as a stationary roller. The sensor unit 710 may comprise a scale, such as belt scale 718, operatively coupled to the at least one support element 738. The sensor unit may be configured to output an indication 737 of the measured weight of the material sensed within the scale weigh span 777 to a computational unit 740.

Figure 8:
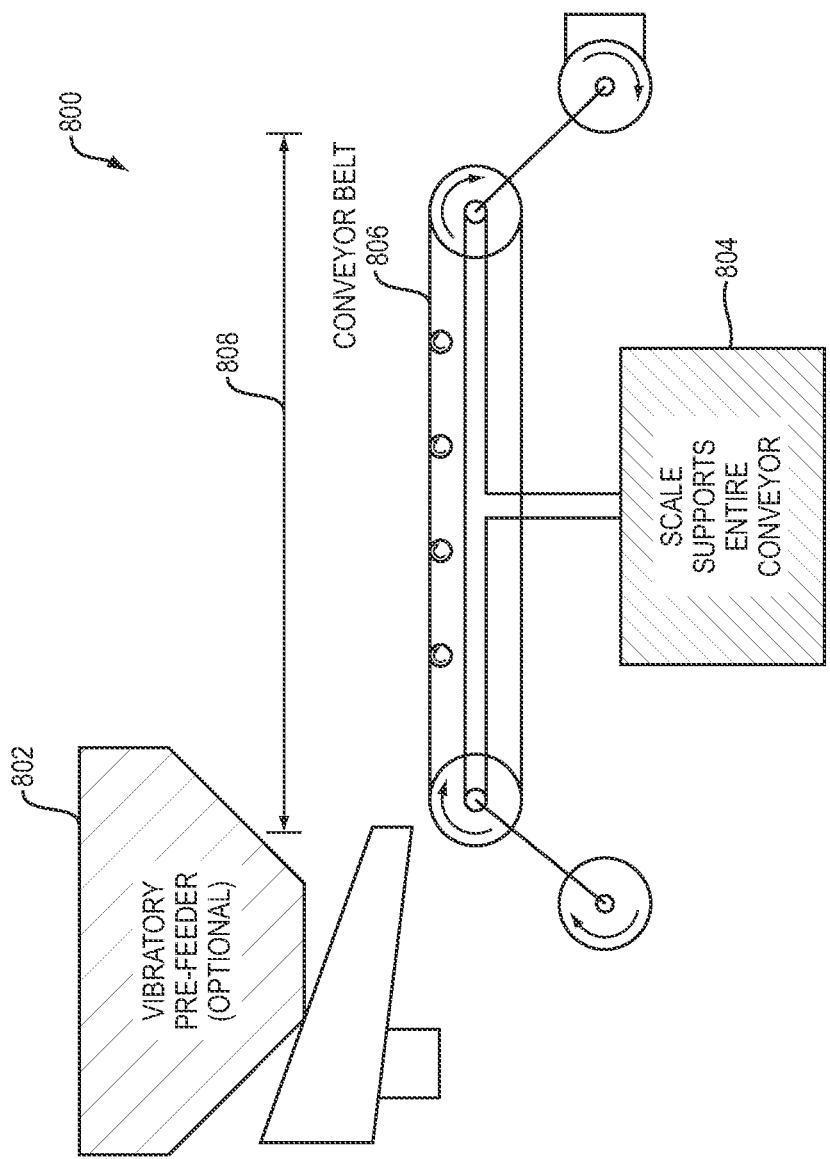
FIG. 8 is a mechanical schematic diagram that illustrates a belt scale supporting a conveyor belt in its entirety and including an optional pre-feeder.

FIG. 8 is a mechanical schematic diagram that illustrates a belt scale supporting a complete conveyor including drive motor and speed sensor and an optional pre-feeder. FIG. 8 illustrates a belt conveyor weighing system 800, the scale 804 may support the conveyor belt and its support structure entirely, and the scale weigh span 808 may be equal to the transport distance 808. Additionally, 802 illustrates the belt conveyor weighing system 800 may optionally use a pre-feeder 802 before the material may be discharged onto the conveyor belt 806. A pre-feeder 802 may be a vibratory, screw, rotary vane, star, or any other suitable type of pre-feeder.

One skilled in the art would also recognize that providing a virtual weigh span, and thus an effective weigh span, may allow system space constraints to be overcome.

Figure 9:
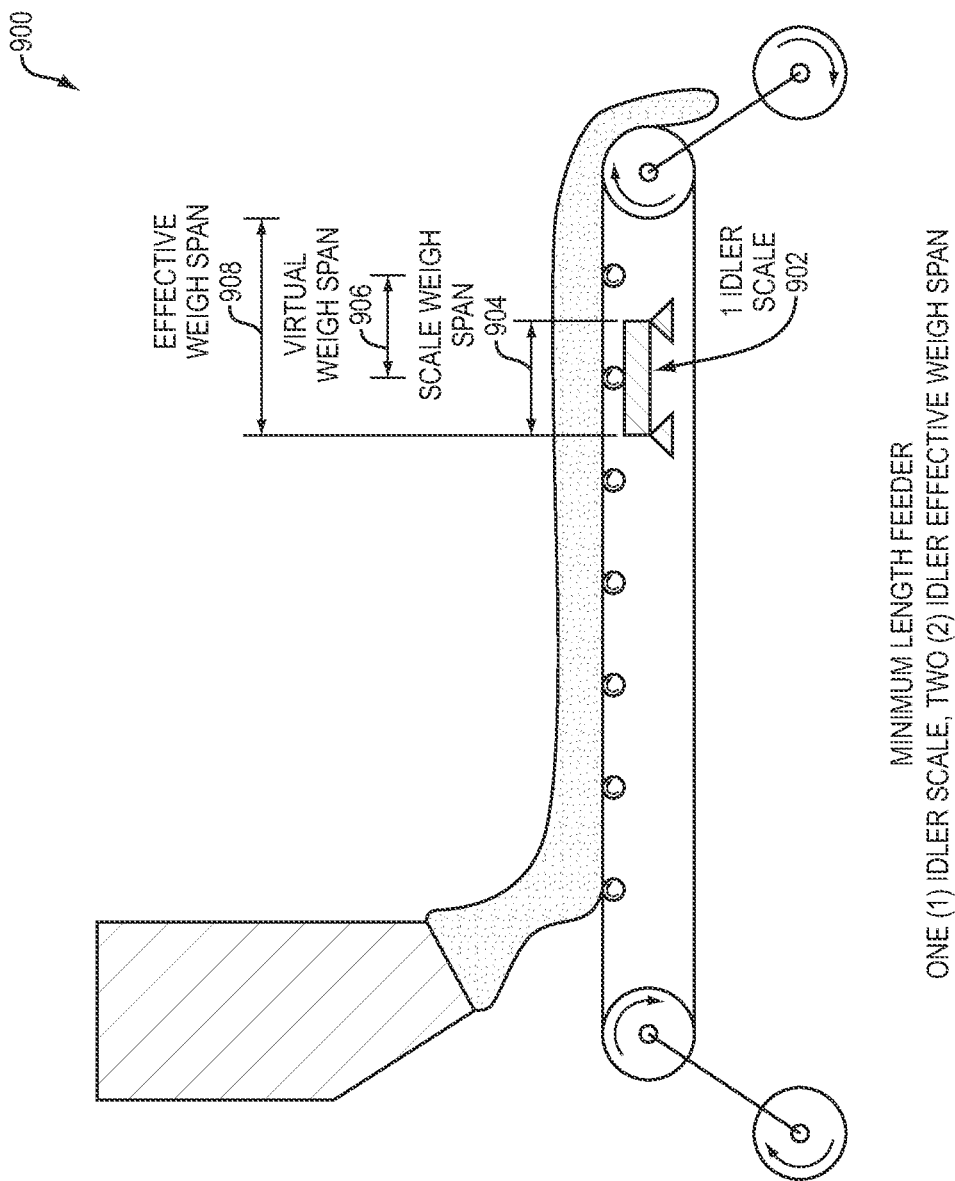
FIG. 9 is a mechanical schematic diagram of a two-idler effective weigh span.

FIG. 9 is a mechanical schematic diagram of a two-idler effective weigh span. FIG. 9 illustrates that a belt conveyor weighing system 900 with a one-idler scale 902, may have a scale weigh span 904. By providing a virtual weigh span 906, the effect is that an effective weigh span of 908 may be utilized for computational purposes, allowing for a conveyor belt system that may effectively have a two-idler weigh span as illustrated by effective weigh span 908.

As previously discussed, a long weigh span provides a number of advantages. For example, a long weigh span provides smaller load signal excursions during periods of splice or idler impact. A long weigh span reduces the effects of belt weight non-uniformity and plastic curvature deformations. A long weigh span may average adjacent idler TIR effects that may constantly be changing due to rotational phase changes between adjacent pairs of idlers.

In addition, a long weigh span may average sporadic disturbances such as those that may be caused by occasional shocks or wind gusts. By providing a belt conveyor weighing system that may perform load averaging that may be based on an effective weigh span such as that of a six-idler scale, a belt conveyor weighing system may employ a single idler scale and may then benefit from advantages of both a single idler and a six-idler weigh span.

Further, a belt conveyor weighing system that employs a single idler scale and utilizes a six-idler effective weigh span may not be impacted as much by splice impact as would a belt conveyor weighing system that employing a six-idler scale. The reason is that impact of the splice with an idler would only occur once per circuit (e.g., a full revolution of the splice) rather than as many times as the number of weigh idlers (e.g., six in this example).

Figure 10B:
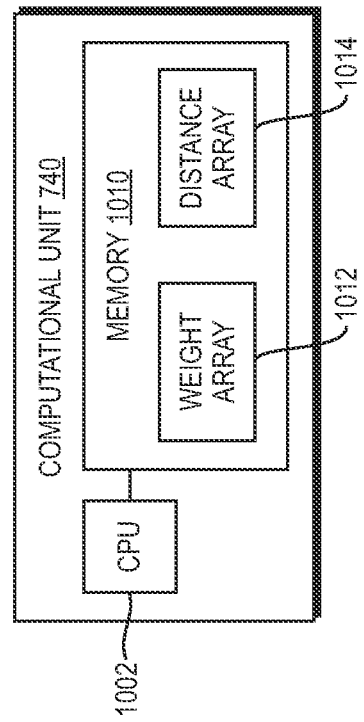
FIG. 10B is a block diagram that illustrates a computational unit.
Figure 10A:
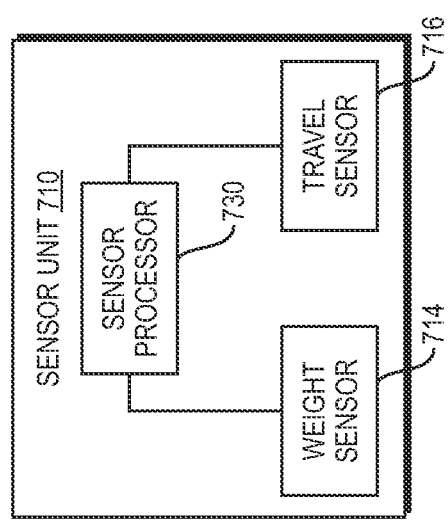
FIG. 10A is a block diagram that illustrates a sensor unit.

FIG. 10A is a block diagram that illustrates a sensor unit. As shown in FIG. 10A, sensor unit 710 may also include sensor processor 730, weight sensor 714, and travel sensor 719.

FIG. 10B is a block diagram that illustrates a computational unit. As shown in FIG. 10B, computational unit 740 may include a central processing unit (CPU) 1002 and memory 1010. Turning back to FIG. 7A, the measured weight of the material sensed may be output, such as loading signal 778 output from the weight sensor 714, to a sensor processor 730. The loading signal 778 output may be an indication of the average weight of material sensed over a scale weigh span 777. The indication 737 of the measured weight of the material sensed may be output in any suitable manner, for example, sensor processor 730 may comprise an analog to digital converter that converts an analog signal of the measured weight to a digital signal that may be output as the indication.

Sensor unit 710 may comprise a travel sensor 719 configured to generate a number of pulses 776 per incremental belt travel distance of the conveyor belt 704. Travel sensor 719 may be coupled to tail pulley 708. Travel sensor 719 may be a rotary pulse generator affixed to the shaft of tail pulley 708, or a wheel of a given circumference that may be in contact conveyor belt 704 and may produce a signal of one pulse per increment of belt travel distance that may have a pulse frequency proportional to a velocity of conveyor belt 704. Sensor unit 710 may be configured to output an indication 734 of the speed of conveyor belt 704 to computational unit 740.

Computational unit 740 may be configured to compute at least one loading metric of a computed weight of material sensed over effective weigh span 718. Effective weigh span 718 may be equal to a sum of the scale weigh span 777 and a virtual weigh span 770 programmably set to a given length of incremental belt travel distance. Computational unit 740 may output control signals 736 that may be used by a process controller 760 to control a motor drive system 750 and may be output to display unit 770. Motor drive system 750 may be configured to control motor 717 configured to drive conveyor belt 704. Motor 717 may be coupled to head pulley 742. Motor 717 may be configured to drive conveyor belt 704 as a function of the at least one loading metric computed.

The at least one loading metric computed may represent an average weight (e.g., lbs) of material per a unit length (e.g., inches, feet, meters, etc.) over the effective weigh span 718. The computational unit may further be configured to continuously integrate the at least one loading metric computed with respect to the incremental belt travel distance sensed to compute a total weight of material that has passed over the effective weigh span 718.

The at least one loading metric computed may represent an average weight of material per a unit length over the effective weigh span. The computational unit may be further configured to compute a speed of the conveyor belt, the speed of the conveyor belt may be based on a rate of change of the incremental belt travel distance sensed. The computational unit may be further configured to compute a flow rate of material, the flow rate of material may be computed as a function of the at least one loading metric computed and the speed of the conveyor belt computed.

The at least one loading metric computed may represent an average weight of material per a unit length over the effective weigh span. The computational unit may be further configured to compute a speed of the conveyor belt and to compute an instantaneous loading metric as a function of the measured weight of material sensed across the scale weigh span. The computational unit may be further configured to continuously integrate the instantaneous loading metric computed over the incremental belt travel distance sensed and to compute an instantaneous flow rate of material. The instantaneous flow rate of material may be computed as a function of the instantaneous loading metric computed and the speed of the conveyor belt computed.

The computational unit may be further configured to produce at least one control signal 736 from at least one of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

The control signals 736 may include signals used to trigger alarms. For example, the computational unit 740 may be configured to produce at least one signal used to trigger at least one alarm by reacting to at least one of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

The belt conveyor weighing system may include a display unit 770. The display unit 770 may be configured to display at least one indication of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

The computational unit may be further configured to compute an instantaneous loading metric. The belt conveyor weighing system may further comprise a feed element 707 configured to apply material 706 to the conveyor belt 704 as a function of the at least one loading metric computed or the instantaneous loading metric computed. For example, computational unit 740 may be configured to output optional control signals 742 to control the feed element 707. For example, pounds per foot loading (lb/ft) may be integrated or multiplied by the computational unit 740 by the speed of the conveyor belt (ft/min).

The result may be a rate of feed or weight per unit of time (lb/min) of the material being metered in the process. Rate information may be expressed in pounds per minute, or metric tons per hour, etc. A desired capacity of the feeder 707 may be programmably set by the computational unit 740 in order to control a rate of flow of material 706. The computational unit 740 may monitor flow rate information of material 706 based on output indications 737 and 734 sent by sensor unit 710. The computational unit 740 may compare monitored flow rate information against desired flow rate information programmably set, and may transmit a correction signal that may be included in either or both the control signals 742 and 736.

Computational unit 740 may be configured to compute an instantaneous loading metric. A belt conveyor weighing system 700 may include a first feed element 707 and a second feed element 780; the second feed element 780 may be downstream of the first feed element 707. The second feed element 780 may be configured to apply an additive to the material responsive to the at least one loading metric computed or the instantaneous loading metric computed.

Virtual weigh span 770 may be based on a maximum flatness deformation length of the conveyor belt (e.g., 404 as shown in FIG. 4B), a distance from a first point being within the scale weigh span to a second point of material discharge, or a multiple of a circumference of a roller, the roller supporting the conveyor belt within the scale weigh span. Virtual weigh span 770 may have particularly relevance to weigh belt feeder applications handling low density products (e.g., potato chips, tobacco, textiles, miscellaneous leafy organic materials, etc.). Such low-density product based applications require the use of special food grade belting that has high plasticity.

A combination of high plasticity and the very light belt loading works to amplify the significance of errors such as belt noise and other errors previously discussed. In addition, the standards regarding idler construction may not have tight tolerances resulting in a harmonic vibration. Correcting for various errors may cause frequent speed corrections to occur unnecessarily. By providing effective weigh span 718 that may be equal to the sum of the virtual weigh span 770 and the scale weigh span 777, the resulting effect is that of having one or more extra weigh idlers that do not physically exist in the system, thus allowing these error effects to be reduced.

Figure 11B:
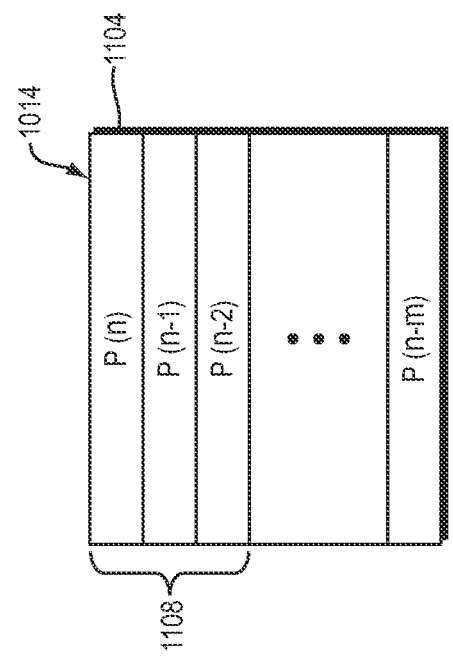
FIGS. 11A and 11B are block diagrams that illustrate paired-element circular arrays.
Figure 11A:
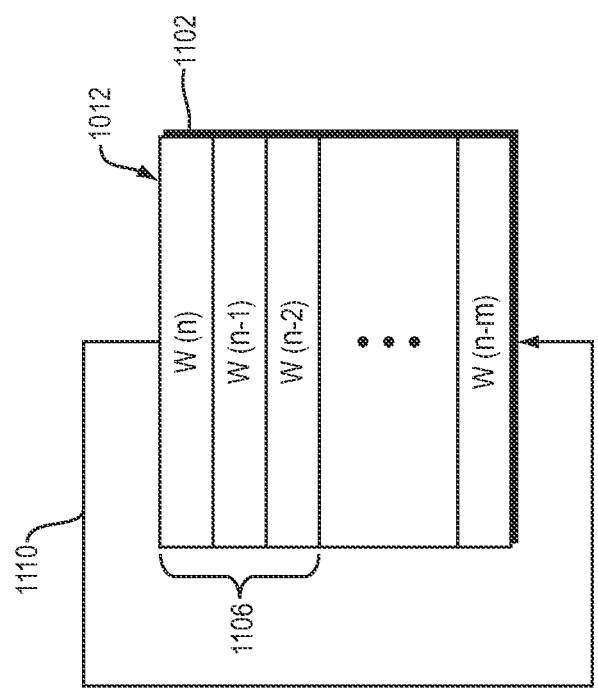

FIGS. 11A and 11B are block diagrams that illustrate paired-element circular arrays. As shown in FIG. 10B, memory 1010 of computational unit 740 may include arrays 1012 and 1014 configured to store weight and distance values respectively. In FIG. 11A and FIG. 11B, arrays 1012 and 1014 may be paired-element circular 1110 arrays configured to store the at least one weight value 1102 and the at least one distance value 1104. Computational unit 740 may be configured to overwrite oldest-populated circular array paired-elements with current values of the at least one weight value and the at least one distance value. Computational unit 740 may be configured to compute the at least one loading metric based on a selection 1106 and 1108 of at least one weight value stored and at least one distance value stored.

Computational unit 740 may be further configured to continuously integrate the at least one loading metric computed with respect to the incremental belt travel distance sensed to compute a total weight of material that has passed over the first effective weigh span. Computational unit 740 may be further configured to produce at least one control signal or at least one alarm signal as a function of the second loading metric computed. Thus, a short weigh span may be used so as to produce material starvation alarms with provisions to shut down the conveyor delivery system, or to facilitate some other type of corrective control action in the shortest possible time, while simultaneously a long weigh span may be used to provide weight totalization.

In many applications the effective weigh span may extend beyond the discharge point, such as discharge pulley 742 of FIG. 7A. Such an extension may create "visual" confusion on the part of operators since computations may then continue even after material has left the conveyor. Also, before shutdown of the belt conveyor weighing system, the system may be required to continue to run for a time duration such that material has been conveyed beyond the limits of the effective weigh span, similar to that of a system employing a multiple idler scale of similar length. Limiting the virtual weigh span such that an effective weigh span may not extend beyond the head pulley may eliminate the visual confusion described and may also provide a visual assurance to the operator that the shutdown requirement is met.

As previously discussed, standards regarding idler construction may not have tight tolerances resulting in a harmonic vibration. In order to reduce error effects resulting from such oscillatory disturbances caused the rotating idler rolls, a virtual weigh span may be programmably set as a multiple of the circumference of the rollers supporting the belt at the belt scale location. At any velocity, the distance of belt movement to turn the roll one complete revolution may be equal to the circumference of the roll. Such synchronization may permit averaging of the measured load over an integral number of complete revolutions of the roll.

A virtual weigh span may be programmably set to reduce error effects due to a lack of belting flatness as previously discussed. As shown in FIG. 4B, sections of the belt may not be flat and may instead have built in curvatures that form raised "humps," such as shown by 406. A raised hump such as 406 may keep the belt from contacting the scale when the belt runs empty. When the belt is carrying a load, the effects of the weight upon it are not felt by the scale owing to the absorption of sufficient load to flatten the hump. A virtual weigh span may be programmably set extending the effective weigh span well beyond a spacing between the two extremity footings of the "hump," such by extending beyond a flatness deformation length 404, providing belt contact with the scale based on a predetermined length of the belt.

The effective weigh span influences a time necessary to stabilize measurements of the various loading metrics. However, combinations may be established to deal with various circumstances. In cases when a belt conveyor weighing system employs a relatively short transport distance, a virtual weigh span may be programmably set such that the effective weigh span may be equal to or greater than the transport distance, thus including or extending beyond a discharge point. For example, a short weigh feeder that shears a constant bed (height) of material from a hopper with a shear gate that may be driven by a variable speed motor could benefit by placing a single idler scale near the material loading point (the shear gate) and a virtual weigh span may be programmably set such that the effective weigh span may extend to the head pulley, or beyond.

A virtual weigh span may be programmably set to a length equal to a complete revolution (or a multiple thereof) of the conveyor belt. A complete revolution (e.g., circuit) of the conveyor belt may be equal to the length (e.g., closed loop length) of the conveyor belt. By setting the virtual weigh span to a complete revolution of the conveyor belt, "partial circuit" integration errors may be resolved.

Partial circuit integration errors are likely to occur when a belt scale is used to weigh smaller batches of material and the belt travels a fraction of, or a small number of, complete circuits. Partial circuit errors may be significant. Since a conveyor belt has an irregular loading effect, weighing may vary depending on the particular portion of belting used. For example, because a conveyor belt has an irregular loading effect, calibrations are conducted over complete circuits of belt travel. If calibrations were not over complete circuits of belt travel, they would vary each time they were conducted depending on the particular portion of belting used. Partial circuit integration errors have been primarily dealt with in one of two conventional ways.

One way of dealing with partial integration errors has been to control the integration interval to conform to complete circuits of belt travel. Integration may be initiated upon sensing that the load is above a threshold level and integration may continue beyond the completion of delivery. Integration may continue for as long as the load sensed is below a threshold level, and stop when the total length of belting travelled is equal to a multiple of the belt length. However, controlling the integration interval in this way is difficult because of variations in empty belt loading. To deal with variations in empty belt loading, the threshold level may need to be set to a high level, which may result in missing a portion of the leading edge of material flow.

A second way of dealing with partial integration errors has been to employ what the industry terms "belt profiling." Belt loading values that reflect the variations are sensed at the scale when the belt is running empty. The sensed values may be stored in memory locations corresponding to the sensed portions of the belt around a complete circuit. The stored values may then be used during actual weighing to compensate for the variations. Belt profiling has a disadvantage because synchronization is necessary to assure correlation with specific portions of the belt. Therefore, another sensor is often utilized to detect a target placed on the belt.

According to techniques disclosed herein, integration may be based on the average loading over the entire conveyor belt circuit, enabling the integration to be insensitive to all belting (e.g., stable and unstable irregularities), by setting the virtual weigh span equal to a multiple of a length of a complete revolution of the conveyor belt. An advantage is provided because there is no need for sensing the arrival and departure of material. In addition there is no need to precisely control the duration of integration. For example, in order to complete the measurement cycle, the conveyor belt need only travel at least one extra revolution after the material has passed over the scale. No interruption of conveyor or integrator operation is required. The virtual weigh span may be set regardless of the length of the scale weigh span. For example, even though a six idler scale may provide greater averaging of its loading signal as compared to a one idler scale, either must integrate their loading signals over a multiple of the belt length in order to average out belting irregularities.

According to techniques disclosed herein, the integration of flow (totalization of throughput), belt loading, and flow rate displays may be based on the computed loading metric. A flow rate signal produced for controlling the speed of the motor and the loading signal used for alarming material starvation may be based on the instantaneous loading metric. The integration of flow based on the instantaneous loading metric may be made available as a diagnostic display that may be compared over test runs to the integration of flow based on the computed loading metric.

Figure 12:
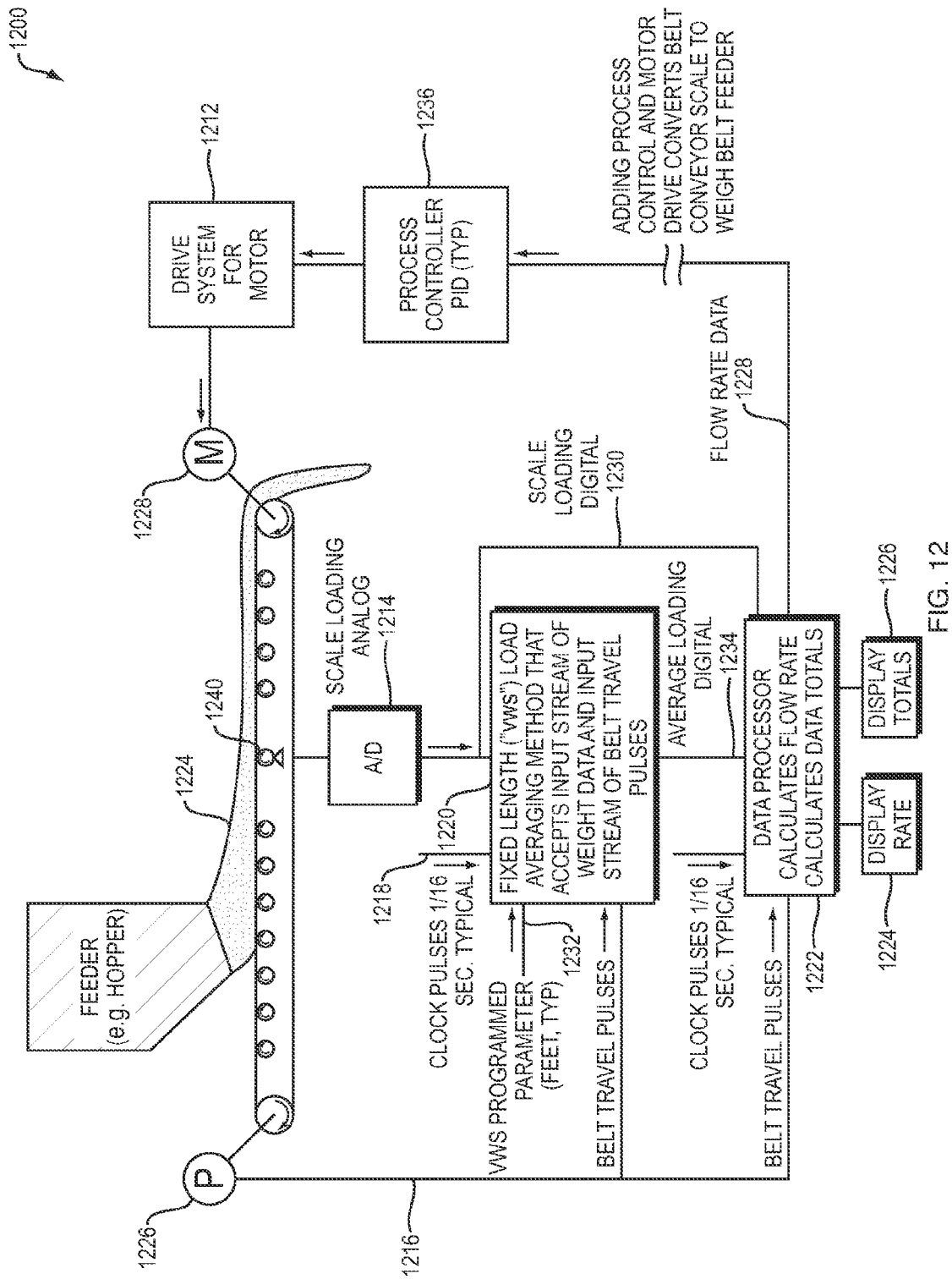
FIG. 12 is a system diagram that illustrates a belt conveyor weighing system implementing a load averaging method.

FIG. 12 is a system diagram that illustrates a belt conveyor weighing system implementing a load averaging method. FIG. 12 shows another illustration of a belt conveyor weighing system 1200. FIG. 12 illustrates a short weigh feeder that shears a constant bed (height) of material 1224 from a hopper with a shear gate that may be driven by a variable speed motor 1228 over a single idler scale 1240. The signal from the load sensing device, such as the belt scale 1240, may be an analog signal that is converted by an A/D 1214 into a digital scale loading signal 1230. The digital scale loading signal 1230 may be combined with another signal 1216 representing belt speed at a data processor based module 1220 that computes an average loading digital signal 1234. A signal representing belt speed 1216 may be a series of pulses as described earlier that may be generated by a pulse tachometer 1226. Data processor based module 1220 may implement a load averaging method that is based on an input stream of weight data 1230, an input stream of belt travel pulses 1216, a clock rate 1218, and a virtual weigh span programmably set 1232. Data processor based module 1222 may compute data flow rates and weigh totals based on the input series of belt travel pulses 1216, the clock rate 1218, and the average loading signal 1234. Data processor based module 1222 may output flow rates 1224 and weight totals 1226 to a display device. Data processor based module 1222 may output a flow rate 1228 that may be used by a process controller 1236 to control the drive system 1212 of the motor 1228. Alternatively, the process controller function may be directly computed within the data processor based module 1222.

Figure 13:
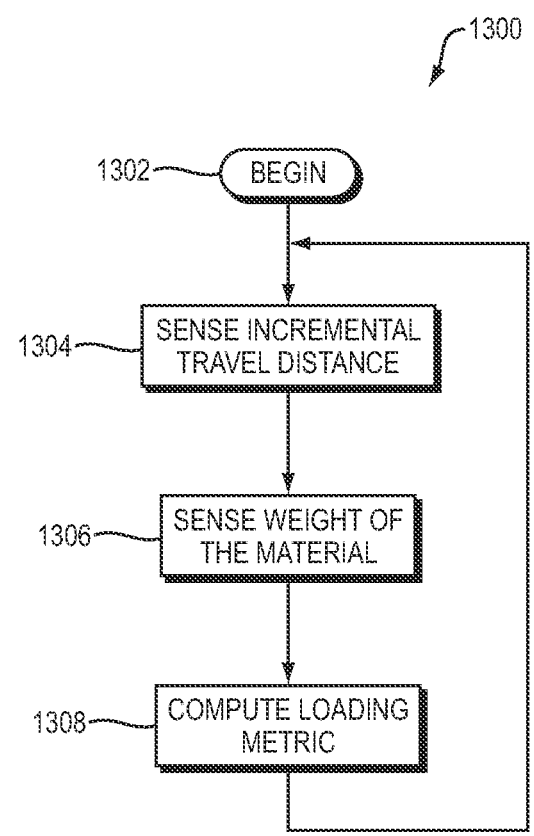
FIG. 13 is a flowchart of a method for weighing material in a belt conveyor weighing system.

FIG. 13 is a flowchart of a method for weighing material in a belt conveyor weighing system (1300) begins at 1302. The method 1300 comprises sensing an incremental belt travel distance of the conveyor belt transporting material across a transport distance (1304). The method includes sensing a measured weight of material across a scale weigh span within the transport distance (1306). The method then includes computing at least one loading metric of a computed weight of material sensed over an effective weigh span equal to the sum of the scale weigh span and a virtual weigh span programmably set to a given length of incremental belt travel distance (1308).

The method provides an adaptive load signal filtering method for conveyor belt weighing that may be effective in reducing the undesirable effects previously discussed. For example, disturbances may originate from out-of-round or unbalanced idlers/pulleys, and/or form from varying and time dependent loading effects due to the "plastic" curvature type impressions that have set into the surface of the belt. While the curvatures generally establish themselves during periods of belt inactivity, they may vary in their intensities throughout the duration of system operation. A moving average based filter method may be used to filter excursions. The method herein provides a moving average that does not operate solely in the time domain, but operates in both time and distance domains simultaneously.

Conventional filtering is based on the time domain, averaging the loading value over a period of time to filter out any excursions as background noise. A major drawback of applying this technique to conveyor belt weighing is that as the belt changes speed, the amount of material being averaged also changes. For example, the slower the belt is moving, the lesser is the amount of material being used to compute an average value.

Thus, a ratio of strength of the loading signal to background noise (e.g., signal to noise ratio) is lower at low speeds than at higher speed, resulting in a compromised filtering setting. By providing a virtual weigh span programmably set, a length of the belt may be specified instead of an amount of time to average the material loading. By providing a virtual weigh span programmably set, a constant length of belt may be inspected, regardless of a speed of the belt. The virtual weigh span may be implemented in any suitable manner. For example, the virtual weigh span may be implemented as a distance, such as feet or meters, or a count of belt travel pulses that may indicate a distance of belt movement. The count may be computed by multiplying pulses per unit length of belt travel by the virtual weigh span.

A sinusoidal vibratory disturbance such as that created by an out of round or unbalanced idler (roller) may have a frequency equal to its speed of rotation and a period equal to the time of its rotation. If the roller is rotated through its contact with a moving belt, it's peripheral velocity may be equal to the belt's velocity and the period of vibration created may be equal to the circumference of the roller divided by the velocity of the belt. By averaging the loading signal from the scale for an effective weigh span that is an exact multiple of the circumference of the roller, the averaging result may be a whole number of completed periods of vibration and may be totally independent of the speed of the belt.

To reduce the error effects that may be caused by an unstable curvature in the belting, the virtual weigh span may be programmable set such that the effective weigh span may envelope the effective span of the curve. It may be desired to reduce both the vibratory and curvature type disturbance error effects, in which case a virtual weigh span may be programmably set such that both effects are reduced. For example, a virtual weigh span that result in an effective weigh span that is long enough to extend beyond the span of the flatness deformation length and also is a multiple of the circumference of idlers or rollers that create disturbances.

Figure 14:
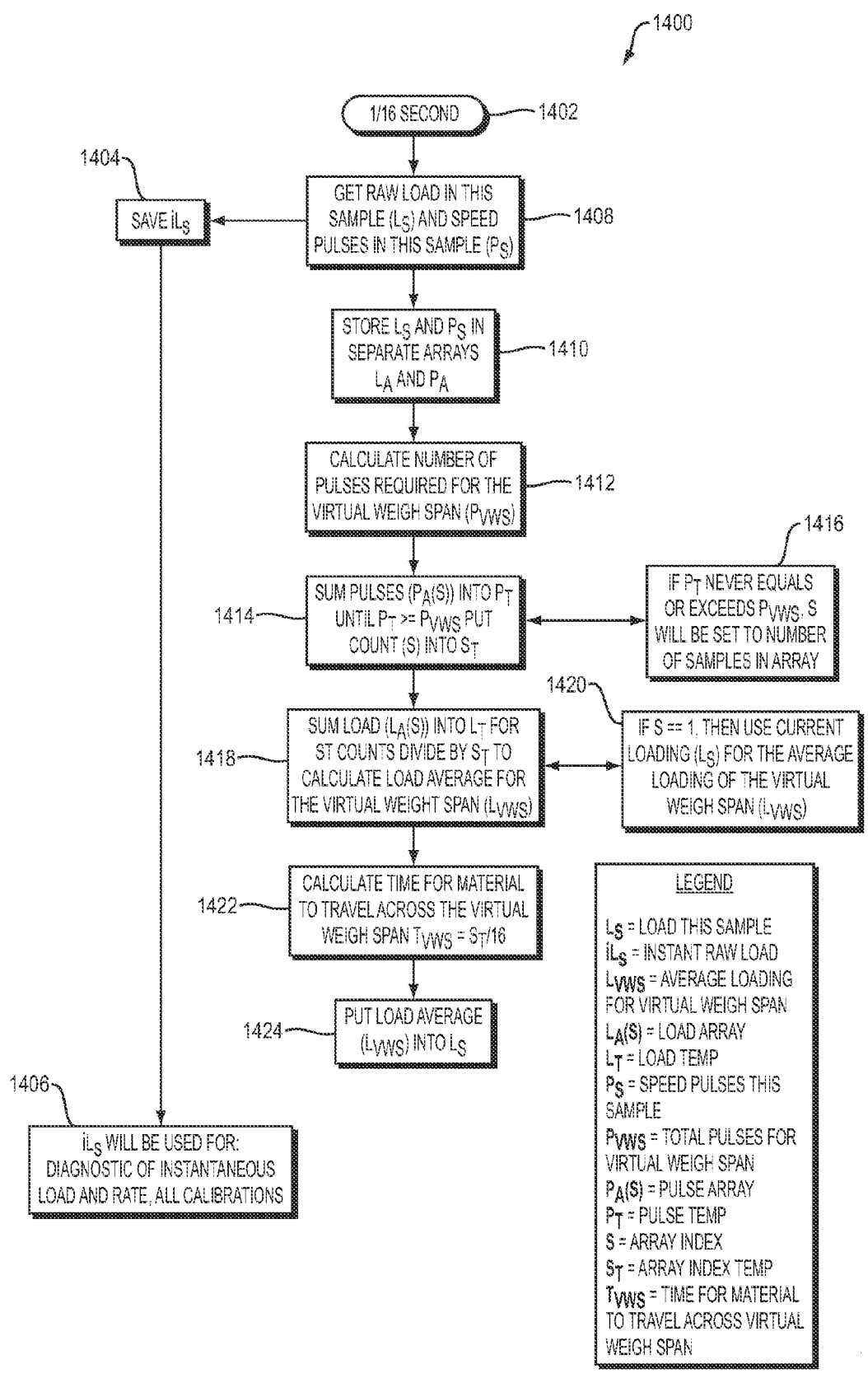
FIG. 14 is a flowchart of a load averaging method.

FIG. 14 is a flowchart of a load averaging method. FIG. 14 illustrates a method of load averaging (1400) may start at 1402 and may be based on a clock rate of 62.5 msec, or any other suitable clock rate. Averaging may be implemented by sampling (1408) and storing the loading value (e.g., lbs/ft), and a distance, as a sample pair (1410). The loading value may be an average weight sensed over a scale weigh span. Distance may be in the form of a number of pulses that represent an increment of distance. The loading and distance sample pair values may be stored as any suitable representation corresponding to the sampled weight of the load and distance travelled by the belt since a last sample was taken. The sample pair may be stored in two paired-element arrays that are circular in structure and may each hold at least 100 seconds of data. The number of pulses required for the virtual weigh span may then be calculated (1412). The loading values (e.g, samples of average weight sensed over a scale weigh span) may be stored and averaged as the belt travels the virtual weigh span; effectively simulating averaging over an effective weigh span.

At each sampling occurrence, the number of pulses and the current loading value may be stored in an Nth element of their respective arrays. By successively looking into previous array elements (N, N−1, N−2, etc.), the sum of the pulses may be compared to the virtual weigh span count until the virtual weigh span count is met or exceeded (1414). A determination may be made to use the count of the number of samples in the array if the sum of the pulses exceeds the virtual weigh span count or the sum of the pulses does not reach the virtual weigh span count given a threshold such as time or any other suitable threshold (1416).

At the same time, an equal number of load values from the loading array, multiplied by the number of pulses in the corresponding pulse array, may also be summed to provide a total loading number. This product provides a loading value for each belt pulse that represents every increment of belt traveled. The average loading value may be computed by dividing the total loading value by the count of the number of pulses captured in the data set (1418). If at 1420 the number of samples is one, then a determination may be made to use the current loading value for the average loading value. The time for the material to travel across the virtual weigh span may be computed (1422) which may be used as a diagnostic tool.

In the event that the totalized pulse count exceeds the number of pulses representing the virtual weigh span, the computation may be adjusted to take into account the pulse count difference and its effect on the stored sum from the element that caused the overage. This adjustment may be based on the number of pulses from the latest array element used that exceeded the number of pulses calculated for the virtual weigh span (1412) by removing an equal number of load product elements from the sum of the total loading number so that they are not included in 1418. The load and pulse information removed from this sum may be used in the next sampling occurrence. Therefore, the number of array elements used in the computation may vary as the speed of the conveyor belt varies.

The average loading value replaces the instantaneous loading value (1424) that had been measured for this sample (1408). All other computations may remain the same, regardless of the use of a virtual weigh span. By saving the instantaneous loading value (1404), an instantaneous rate may be computed (1406). Alarms and shutdown triggers may be given an option for being triggered based on data derived from the virtual weigh span or from the instantaneous load value. The instantaneous load may be used during times of calibration to remove the natural effects of averaging of the load signal, which would require more time to perform calibrations.

Figure 15:
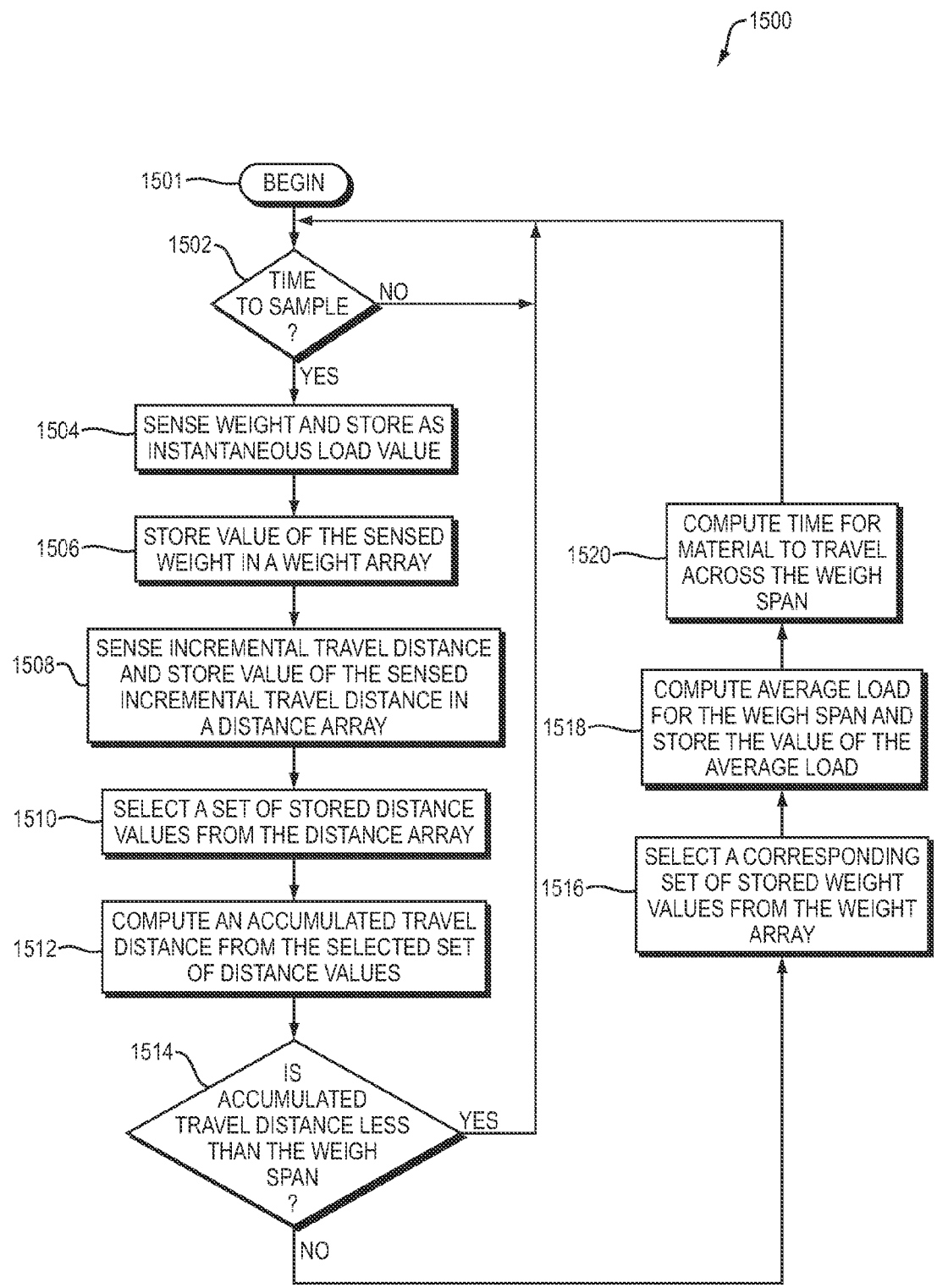
FIG. 15 is a flowchart of another method for weighing material in a belt conveyor weighing system.

FIG. 15 is a flowchart of another method for weighing material in a belt conveyor weighing system. FIG. 15 illustrates a method for weighing material in a belt conveyor weighing system (1500) that starts at 1501. A determination may then be made as to whether or not it is time to sample (1502). If it is time to sample, the sensed weight may be stored as an instantaneous loading value (1504). The value of the sensed weight may be stored in a weight array (1506). An incremental travel distance may be sensed and the value of the sensed incremental travel distance may be stored in a distance array (1508).

A set of stored distance values may be selected from the distance array (1510), and an accumulated travel distance may be computed (1512). The accumulated travel distance may be compared to the weigh span, such as the effective weigh span (1514). If at 1514 the accumulated distance is equal to or greater than the weigh span, then a corresponding set of stored weight values may be selected from the weight array (1516). An average load for the weigh span may be computed and stored (1518). The time for the material to travel across the weigh span may be computed (1520), and then a check may again be made to determine if it is time to sample (1502), such as would also be the case if it was determined that the accumulated travel distance was less than the weigh span (1514).

Thus, a loading metric may be computed that may represent an average weight of material per a unit length over the effective weigh span. The method may further comprise continuously integrating the at least one loading metric computed with respect to the incremental belt travel distance sensed, and computing a total weight of material that has passed over the effective weigh span. The virtual weigh span may be programmably set to equal a length of a multiple of a complete revolution of the conveyor belt. The multiple may be one or more. The method may further comprise computing a speed of the conveyor belt, the speed of the conveyor belt may be based on a rate of change of the incremental belt travel distance sensed. The method may comprise computing a flow rate of material, the flow rate of material computed may be a function of the at least one loading metric computed and the speed of the conveyor belt computed. The loading metric computed may represent an average weight of material per a unit length over the effective weigh span.

Calibration of a belt scale may have multiple modes and multiple steps of operation. A first mode of calibration may be to establish a relationship between a measured raw loading from the scale to a known weight. This initial calibration mode may generally only be performed when the scale is installed or if some critical parameter involving some metric of the scale has changed.

A second calibration mode may be normal calibration and may verify an accuracy of the initial calibration performed. This normal mode may be used on a regular basis to insure the scale is properly calibrated. Since the initial calibration mode may be used before the instrument knows what to expect from the scale, it may require at least two parameters programmably set. The at least two parameters may inform the user if the loading seen on the scale is approximately correct.

Two steps may be used during the calibration of either calibration mode. One may be with the scale empty, e.g., a zero load, and one may be with a known weight placed in a calibration position on the scale, e.g., a test load. A first step may be to zero balance the scale so that the result of an integration of the loading signal is zero when the belt is empty, and the integration then is taken over a distance of an integral number of full belt revolutions. Integral revolutions may be used so as to not include the effects of apparent variations in the weight of the belt. Integration may provide a displayed calibration result that counts forward and backward over the duration of the calibration run.

After achieving an acceptable zero balance, a second step may "span" the instrumentation providing a similar integration of the loading signal as when the belt scale is under a "simulated" loading condition and produces a displayed result matching a calculated product of a simulated loading value and a length of belting corresponding to the integral number of full revolutions of the belt. A convenient simulated load may be a properly sized test weight that when applied to a belt scale having a known scale weigh span, or effective weigh span, would produce the desired loading per unit of belt length for which the scale is to be calibrated.

For example, an objective may be to provide a simulated test weight representing five hundred pounds per minute for a two idler scale with a direct load cell support operating with idlers spaced uniformly at four feet throughout length of conveyor at a belt speed of one hundred feet per minute. The scale weigh span may be eight feet. The loading when the rate is 500 lb/ft, and the speed is 100 ft/min, may be 500/100=5 lb/ft. The required test weight may be the product of the scale weigh span and the loading, or 8×5=40 pounds. During normal calibration, parameters may be programmably set to indicate how well calibrated a scale may be at the same two points—zero and test loading. A user may be given a choice to accept or reject results from the latest calibration. A log may be kept that shows the results from, for example, the last fifty or so calibrations, so that a user may review to determine how well the scale has maintained calibration.

Another calibration mode may be an auto-zero mode. Auto-zero mode may work similar to a first part of normal calibration, but may also require a maximum allowable error programmably set. Auto-zero mode may be performed either automatically or whenever the loading on the scale falls below a predetermined value programmably set, or upon a request from a user.

Yet another calibration mode may be a completely automatic normal calibration mode, or auto-cal. Auto-cal mode may utilize an automatic means for moving a test load on and off the scale; the means may be controlled by a calibration instrument. Similar to the auto-zero mode, maximum zero and test load error parameters may be programmably set such that they are acceptable to a user. In both auto-zero or auto-cal mode, results being outside the maximum parameter values may trigger a calibration abort event, as well as one, or more, corrective actions.

The novel system and methods discussed herein may apply to any measurement system that may operate on a primary measurement and a secondary measurement that may be a time-independent duration over which the average value of the primary measurement is to be based. As may be appreciated, measurements of loading (e.g. lbs/ft), flow rate (e.g., lbs/min), and speed (e.g., ft/min) may be mathematically related such as flow rate=loading×speed. The techniques discussed herein are not dependent upon any order of computation, as any one of these measurements may be obtained by measurements of the other two.

It is within the scope that techniques herein may also apply to systems that do not employ a weighing device such as a scale.

Figure 16:
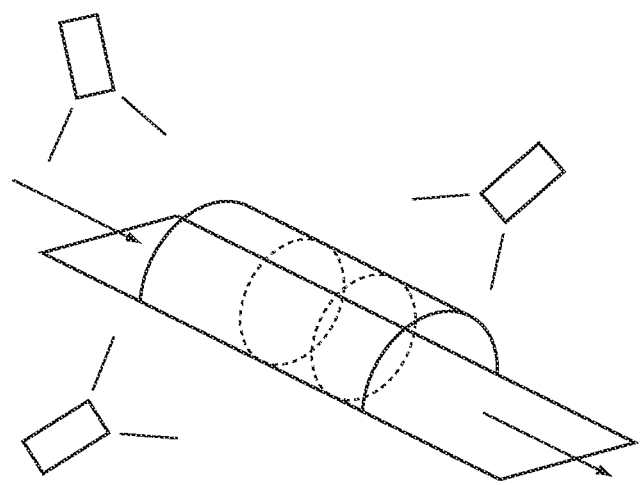
FIG. 16 is a block diagram of a 3-D imaging system that provides an alternative mechanism for sensing a volume, or weight by conversion, to an amount of material being transported over a given distance of a conveyor belt.

FIG. 16 is a block diagram of a 3-D imaging system that provides an alternative mechanism for sensing a volume, or weight by conversion, to an amount of material being transported over a given distance of a conveyor belt. In addition, liquid systems may be based on a density measurement, or may be based on a volumetric measurement. Such systems may also benefit from techniques discussed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "unit," "module," or "system."

Aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

While this invention has been particularly shown and described with references to example embodiments thereof, it will be understood by those skilled in the art that various changes in form and details may be made therein without departing from the scope of the invention encompassed by the appended claims.

What is claimed is:

1. A belt conveyor weighing system, comprising:
   a conveyor belt configured to transport material across a transport distance;
   a sensor unit configured to sense incremental belt travel distance of the conveyor belt and to sense a measured weight of material across a scale weigh span within the transport distance; and
   a computational unit configured to compute at least one loading metric of a computed weight of material sensed over an effective weigh span equal to a sum of the scale weigh span and a virtual weigh span programmably set to a given length of incremental belt travel distance.

2. The system of claim 1 wherein the at least one loading metric computed represents an average weight of material per a unit length over the effective weigh span and wherein the computational unit is further configured to continuously integrate the at least one loading metric computed with respect to the incremental belt travel distance sensed to compute a total weight of material that has passed over the effective weigh span.

3. The system of claim 2 wherein the virtual weigh span is programmably set to a length of a multiple of a complete revolution of the conveyor belt.

4. The system of claim 1 wherein the at least one loading metric computed represents an average weight of material per a unit length over the effective weigh span and wherein the computational unit is further configured to compute a speed of the conveyor belt, the speed of the conveyor belt being based on a rate of change of the incremental belt travel distance sensed, and wherein the computational unit is further configured to compute a flow rate of material, the flow rate of material computed being a function of the at least one loading metric computed and the speed of the conveyor belt computed.

5. The system of claim 1 wherein the at least one loading metric computed represents an average weight of material per a unit length over the effective weigh span and wherein the computational unit is further configured to:
compute a speed of the conveyor belt; and
compute an instantaneous loading metric as a function of the measured weight of material sensed across the scale weigh span; and wherein the computational unit is further configured to:
continuously integrate the instantaneous loading metric computed over the incremental belt travel distance sensed; and
compute an instantaneous flow rate of material, the instantaneous flow rate of material computed being a function of the instantaneous loading metric computed and the speed of the conveyor belt computed.

6. The system of claim 5 wherein the computational unit is further configured to produce at least one signal used to trigger at least one alarm by reacting to at least one of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

7. The system of claim 5 further comprising a display unit configured to display at least one indication of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

8. The system of claim 5 wherein the computational unit is further configured to produce at least one control signal from at least one of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

9. The system of claim 1 wherein the computational unit is further configured to compute an instantaneous loading metric, and wherein the system of claim 1 further comprises a feed element configured to apply material to the conveyor belt as a function of the at least one loading metric computed or the instantaneous loading metric computed.

10. The system of claim 1 wherein the computational unit is further configured to compute an instantaneous loading metric, the wherein the system of claim 1 further comprises a first feed element and a second feed element, the second feed element being downstream of the first feed element, and further wherein the second feed element is configured to apply an additive to the material responsive to the at least one loading metric computed or the instantaneous loading metric computed.

11. The system of claim 1 wherein the virtual weigh span is based on a maximum flatness deformation length of the conveyor belt, a distance from a first point being within the scale weigh span to a second point of material discharge, or a multiple of a circumference of a roller, the roller supporting the conveyor belt within the scale weigh span.

12. The system of claim 1 wherein the conveyor belt is coupled to a head pulley and a tail pulley and supported therebetween by at least one support element, and wherein the sensor unit includes a scale operatively coupled to one or more of the at least one support element, and further wherein the scale weigh span is defined by a distance for which weight of the material is measureable by the scale.

13. The system of claim 1 wherein the conveyor belt is coupled to a head pulley and a tail pulley and is supported therebetween by at least one support element, the at least one support element being at least one freely rotatable element or at least one non-rotatable frictional element, the at least one freely rotatable element being a roller or an idler, the at least one non-rotatable frictional element being a flat slider plate or a fixed circular, inverted U-shaped, or inverted V-shaped rod acting as a stationary roller, and wherein the sensor unit comprises a scale operatively coupled to the at least one support element and wherein the sensor unit is further configured to output an indication of the measured weight of the material sensed within the scale weigh span to the computational unit.

14. The system of claim 1 wherein the sensor unit comprises a scale, the scale supporting the conveyor belt and its support structure entirely, and further wherein the scale weigh span is equal to the transport distance.

15. The system of claim 1 wherein the computational unit includes memory configured to store at least one weight value corresponding to the measured weight of the material sensed and at least one distance value corresponding to the incremental belt travel distance of the conveyor belt sensed.

16. The system of claim 15 wherein the computational unit is configured to compute the at least one loading metric based on a selection of at least one weight value stored and at least one distance value stored.

17. The system of claim 15 wherein the memory includes paired-element circular arrays configured to store the at least one weight value and the at least one distance value, and wherein the computational unit is configured to overwrite oldest-populated circular array paired-elements with current values of the at least one weight value and the at least one distance value.

18. The system of claim 15 wherein the sensor unit further comprises a travel sensor configured to generate a number of pulses per incremental belt travel distance of the conveyor belt and wherein the at least one distance value stored is a count of the number of pulses generated.

19. The system of claim 1 further comprising a motor configured to drive the conveyor belt as a function of the at least one loading metric computed.

20. The system of claim 1 wherein the sum is a first sum, the virtual weigh span is a first virtual weigh span, the given length of incremental belt travel distance is a first given length of incremental belt travel distance, the at least one loading metric computed is a first at least one loading metric computed, the computed weight of material sensed is a first computed weight of material sensed and wherein the computational unit is further configured to compute a second loading metric of a second computed weight of material sensed over a second effective weigh span less than the first effective weigh span, the second effective weigh span being equal to the scale weigh span or being equal to a second sum of the scale weigh span and a second virtual weigh span programmably set to a second given length of incremental belt travel distance.

21. The system of claim 20 wherein the computational unit is further configured to continuously integrate the first at least one loading metric computed with respect to the incremental belt travel distance sensed to compute a total weight of material that has passed over the first effective weigh span, and wherein the computational unit is further configured to produce at least one control signal or at least one alarm signal as a function of the second loading metric computed.

22. A method for weighing material on a conveyor belt, the method comprising:
sensing an incremental belt travel distance of the conveyor belt transporting material across a transport distance;
sensing a measured weight of material across a scale weigh span within the transport distance; and
computing at least one loading metric of a computed weight of material sensed over an effective weigh span equal to the sum of the scale weigh span and a virtual weigh span programmably set to a given length of incremental belt travel distance.

23. The method of claim 22 wherein the loading metric computed represents an average weight of material per a unit length over the effective weigh span, the method of claim 22 further comprising:
continuously integrating the at least one loading metric computed with respect to the incremental belt travel distance sensed; and
computing a total weight of material that has passed over the effective weigh span.

24. The method of claim 23 wherein the virtual weigh span is programmably set to a length of a multiple of a complete revolution of the conveyor belt.

25. The method of claim 22 further comprising:
computing a speed of the conveyor belt, the speed of the conveyor belt being based on a rate of change of the incremental belt travel distance sensed; and
computing a flow rate of material, the flow rate of material computed being a function of the at least one loading metric computed and the speed of the conveyor belt computed, wherein the loading metric computed represents an average weight of material per a unit length over the effective weigh span.

26. The method of claim 22 further comprising:
computing a speed of the conveyor belt, the speed of the conveyor belt being based on a rate of change of the incremental belt travel distance sensed;
computing an instantaneous loading metric as a function of the weight of the material sensed across the scale weigh span;
continuously integrating the instantaneous loading metric computed over the incremental belt travel distance; and
computing an instantaneous flow rate of the material, the instantaneous flow rate computed being a function of the instantaneous loading metric computed and the speed of the conveyor belt computed, wherein the loading metric computed represents an average weight of material per a unit length over the effective weigh span.

27. The method of claim 26 further comprising producing at least one signal used to trigger at least one alarm by reacting to at least one of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

28. The method of claim 26 further comprising displaying at least one indication of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

29. The method of claim 26 further comprising producing at least one control signal from at least one of the following: the at least one loading metric computed, the instantaneous loading metric computed, the speed of the conveyor belt computed, an integrated value of the loading metric computed, an integrated value of the instantaneous loading metric computed, the flow rate of material computed, or the instantaneous flow rate of material computed.

30. The method of claim 22 further comprising:
computing an instantaneous loading metric as a function of the weight of the material sensed across the scale weigh span; and
applying the material to the conveyor belt as a function of the at least one loading metric computed or the instantaneous loading metric computed.

31. The method of claim 22 further comprising:
computing an instantaneous loading metric as a function of the weight of the material sensed across the scale weigh span; and
applying an amount of an additive to the material by responding to the at least one loading metric computed or the instantaneous loading metric computed.

32. The method of claim 22 wherein the virtual weigh span is based on a maximum flatness deformation length of the conveyor belt, a distance from a first point being within the scale weigh span to a second point of material discharge, or a multiple of a circumference of a roller, the roller supporting the conveyor belt within the scale weigh span.

33. The method of claim 22 further comprising:
coupling the conveyor belt to a head pulley and a tail pulley and supporting the conveyor belt therebetween by at least one support element; and
operatively coupling a scale to one or more of the at least one support element and wherein the scale weigh span is defined by a distance for which weight of the material is measureable by the scale.

34. The method of claim 22 further comprising:
coupling the conveyor belt to a head pulley and a tail pulley and supporting the conveyor belt therebetween by at least one support element;
operatively coupling a scale to the at least one support element; and
outputting an indication of the measured weight of the material sensed within the scale weigh span, wherein the at least one support element is at least one freely rotatable element or at least one non-rotatable frictional element, the at least one freely rotatable element being a roller or an idler, the at least one non-rotatable frictional element being a flat slider plate or a fixed circular, inverted U-shaped, or inverted V-shaped rod acting as a stationary roller.

35. The method of claim 22 further comprising supporting the conveyor belt and its support structure by a scale and further wherein the scale weigh span is equal to the transport distance.

36. The method of claim 22 further comprising storing at least one weight value corresponding to the measured weight of the material sensed and at least one distance value corresponding to the incremental belt travel distance of the conveyor belt sensed.

37. The method of claim 36 further comprising:
selecting a set of values, the set of values selected comprising at least one weight value stored and at least one distance value stored; and
computing the at least one loading metric based on the set of values selected.

38. The method of claim 36 further comprising storing the at least one weight value and the at least one distance value in paired-element circular arrays, oldest-populated circular array paired-elements being overwritten with respective current values of the at least one weight value and the at least one distance value.

39. The method of claim 36 further comprising generating a number of pulses per incremental belt travel distance of the conveyor belt and storing the at least one distance value as a count of the number of pulses generated.

40. The method of claim 38 wherein computing the at least one loading metric further comprises selecting a set of at least one distance value stored and at least one weight value stored from the paired-element circular arrays.

41. The method of claim 22 further comprising driving the conveyor belt as a function of the at least one loading metric computed.

42. The method of claim 22 wherein the sum is a first sum, the virtual weigh span is a first virtual weigh span, the given length of incremental belt travel distance is a first given length of incremental belt travel distance, the at least one loading metric computed is a first at least one loading metric computed, the computed weight of material sensed is a first computed weight of material sensed, the method of claim 22 further comprising:
computing a second loading metric of a second computed weight of material sensed over a second effective weigh span less than the first effective weigh span, the second effective weigh span being equal to the scale weigh span or being equal to a second sum of the scale weigh span and a second virtual weigh span programmably set to a second given length of incremental belt travel distance.

43. The method of claim 42 further comprising:
continuously integrating the first at least one loading metric computed with respect to the incremental belt travel distance sensed and computing a total weight of material that has passed over the first effective weigh span; and
producing at least one control signal or at least one alarm signal as a function of the second at least one loading metric computed.

44. A non-transitory computer-readable medium having encoded thereon a sequence of instructions which, when executed by a processor, causes the processor to:
sense an incremental belt travel distance of the conveyor belt transporting material across a transport distance;
sense a measured weight of the material across a scale weigh span within the transport distance; and
compute at least one loading metric of a computed weight of material sensed over an effective weigh span equal to a sum of the scale weigh span and a virtual weigh span programmably set to a given length of incremental belt travel distance.

45. An apparatus for weighing material on a conveyor belt, the apparatus comprising:
means for sensing an incremental belt travel distance of the conveyor belt transporting material across a transport distance;
means for sensing a measured weight of the material across a scale weigh span within the transport distance; and
means for computing at least one loading metric of a computed weight of material sensed over an effective weigh span equal to a sum of the scale weigh span and a virtual weigh span programmably set to a given length of incremental belt travel distance.

46. The system of claim 1 wherein the sensor unit includes (i) a 3-D imaging system configured to sense the measured weight of material across the scale weigh span by sensing volume, or weight by conversion, of the material being transported across the scale weigh span or (ii) a liquid measurement system configured to sense the measured weight of material across the scale weigh based on a density measurement or a volumetric measurement of the material being transported across the scale weigh span.

47. The method of claim 22 wherein sensing the measured weight of material across the scale weigh span within the transport distance includes employing (i) a 3-D imaging system to sense volume, or weight by conversion, of the material being transported across the scale weigh span or (ii) a liquid measurement system configured to sense the measured weight of material across the scale weigh based on a density measurement or a volumetric measurement of the material being transported across the scale weigh span.

* * * * *